United States Patent
Aylett et al.

(10) Patent No.: US 10,936,740 B2
(45) Date of Patent: Mar. 2, 2021

(54) SYSTEMS AND METHODS FOR SECURING AN ENTITY-RELATIONSHIP SYSTEM

(71) Applicant: Global Software Innovation Pty Ltd, Baulkham Hills (AU)

(72) Inventors: Peter Kyra Aylett, North Ryde (AU); Constantinos Christou, Collaroy Plateau (AU); Anthony Christian Langsworth, Concord West (AU); David Gregory Quint, Kariong (AU); Scott Hopwood, West Pymble (AU)

(73) Assignee: GLOBAL SOFTWARE INNOVATION PTY LTD, Baulkham Hills (AU)

( * ) Notice: Subject to any disclaimer, the term of this patent is extended or adjusted under 35 U.S.C. 154(b) by 307 days.

(21) Appl. No.: 16/074,717

(22) PCT Filed: Feb. 1, 2017

(86) PCT No.: PCT/AU2017/000032
§ 371 (c)(1),
(2) Date: Aug. 1, 2018

(87) PCT Pub. No.: WO2017/136867
PCT Pub. Date: Aug. 17, 2017

(65) Prior Publication Data
US 2019/0042782 A1  Feb. 7, 2019

(30) Foreign Application Priority Data

Feb. 11, 2016 (AU) .................................. 2016900465

(51) Int. Cl.
*G06F 21/62* (2013.01)
*G06F 16/28* (2019.01)

(52) U.S. Cl.
CPC ........ *G06F 21/6218* (2013.01); *G06F 16/284* (2019.01); *G06F 2221/2141* (2013.01)

(58) Field of Classification Search
CPC ............... G06F 21/6218; G06F 16/284; G06F 2221/2141

(Continued)

(56) References Cited

U.S. PATENT DOCUMENTS 8,190,673 B2    5/2012   Junghans et al.
8,429,723 B2 *  4/2013   Porcari ................. G06Q 10/10
                                                  726/4

(Continued)

FOREIGN PATENT DOCUMENTS

WO        1999040525 A2    8/1999

OTHER PUBLICATIONS

Jeloka, S., et al., "Oracle ® Database Security Guide 10g Release 2," Jul. 2012, 348 pages.

*Primary Examiner* — Kambiz Zand
*Assistant Examiner* — Aubrey H Wyszynski
(74) *Attorney, Agent, or Firm* — Slater Matsil, LLP

(57) ABSTRACT

A computer implemented method of securing information stored in an entity relationship database system comprising at least one entity relationship database, the information stored in the entity relationship database system being stored according to an entity relationship model, the method comprising the steps of: specifying access rules limiting access to the entity relationship database system; storing the access rules in the entity relationship database system according to the entity relationship model; permitting an accessor to create an entity in the entity relationship database system if a "create-check" process dependent upon at least one of the one or more stored access rules grants permission; and permitting the accessor to read or modify or delete an entity (Continued)

stored in the entity relationship database system if a "non-create-check" process dependent upon at least one of the one or more stored access rules grants permission.

16 Claims, 20 Drawing Sheets

(58) Field of Classification Search
USPC .......................................................... 726/28
See application file for complete search history.

(56) References Cited

U.S. PATENT DOCUMENTS

| | | | |
|---|---|---|---|
| 8,433,717 B2* | 4/2013 | Korablev | G06F 21/6218 |
| | | | 707/758 |
| 8,973,106 B2* | 3/2015 | Warshavsky | H04L 63/10 |
| | | | 726/4 |

* cited by examiner

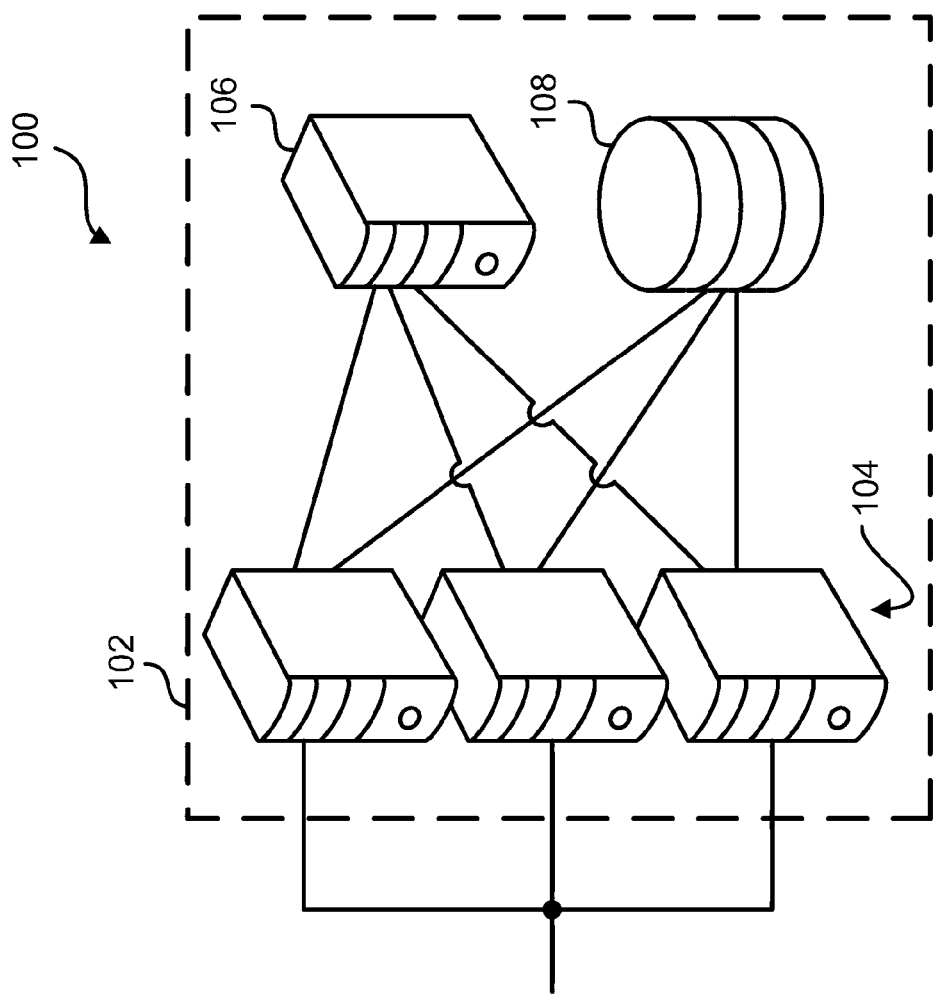
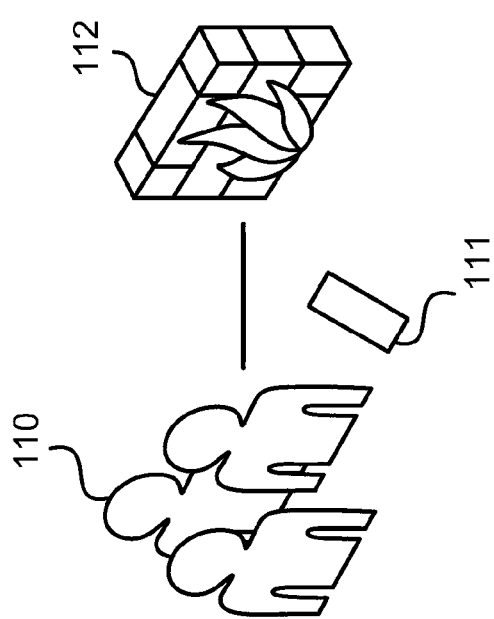
Fig. 1A

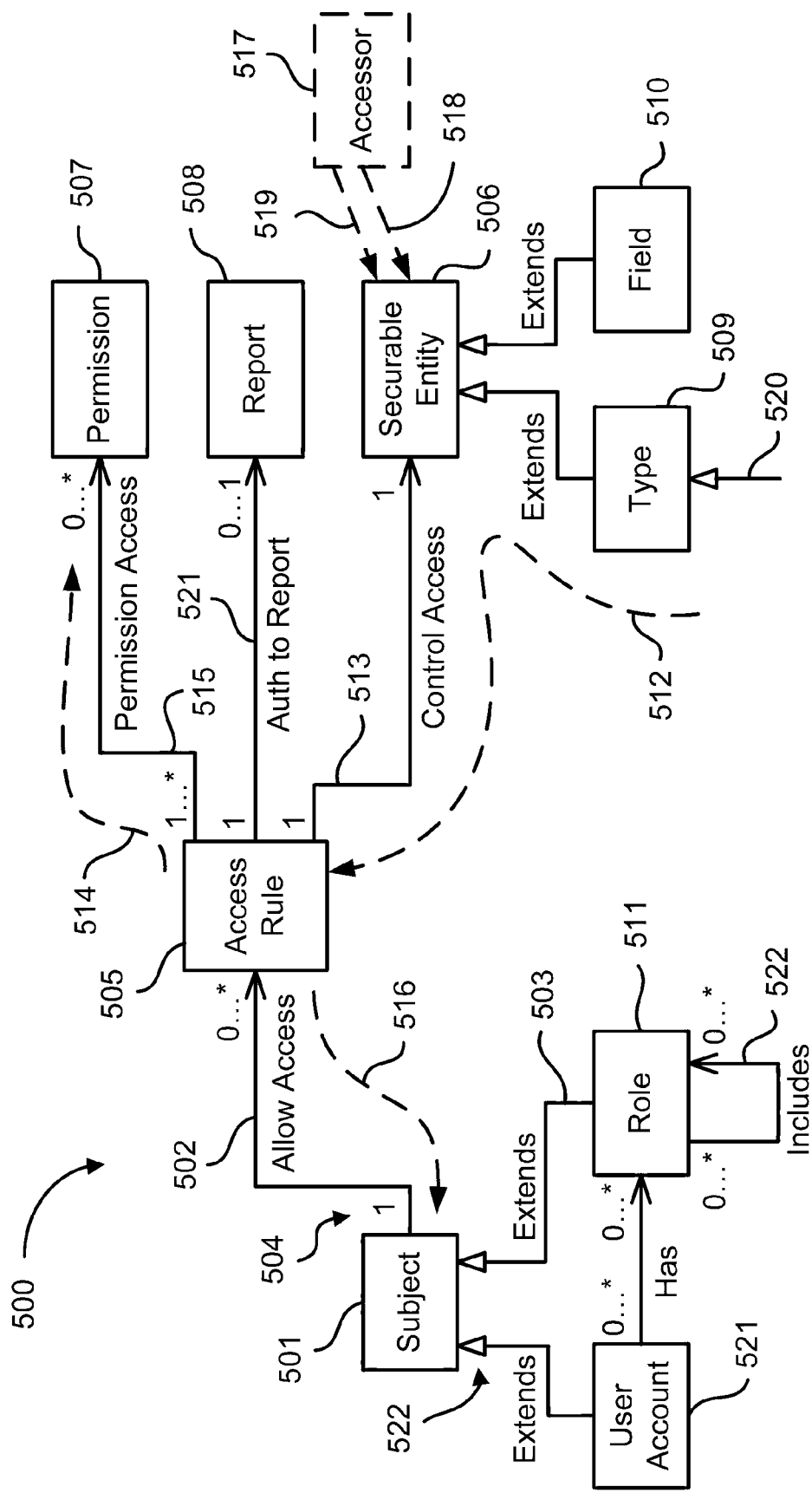
Fig. 4 Entities and relationships in an Access Rule

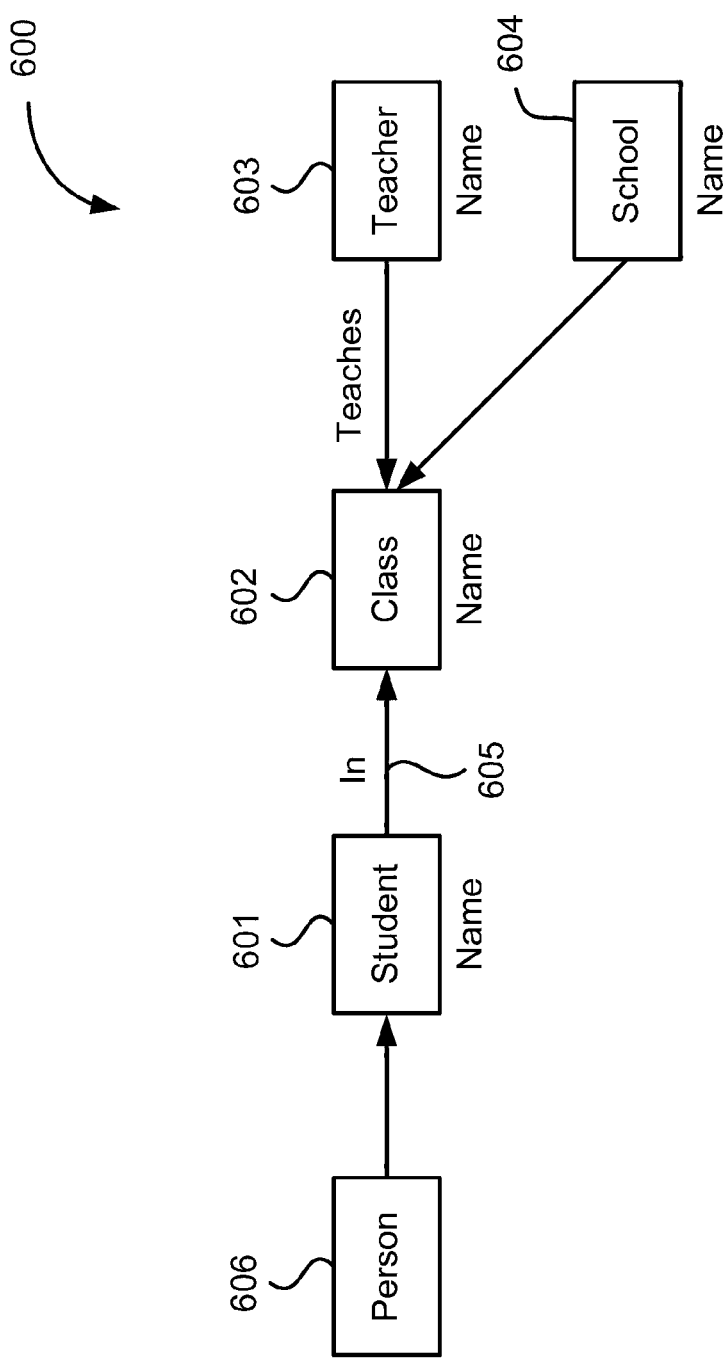
Fig. 5  Example School Management System Entities and Relationships

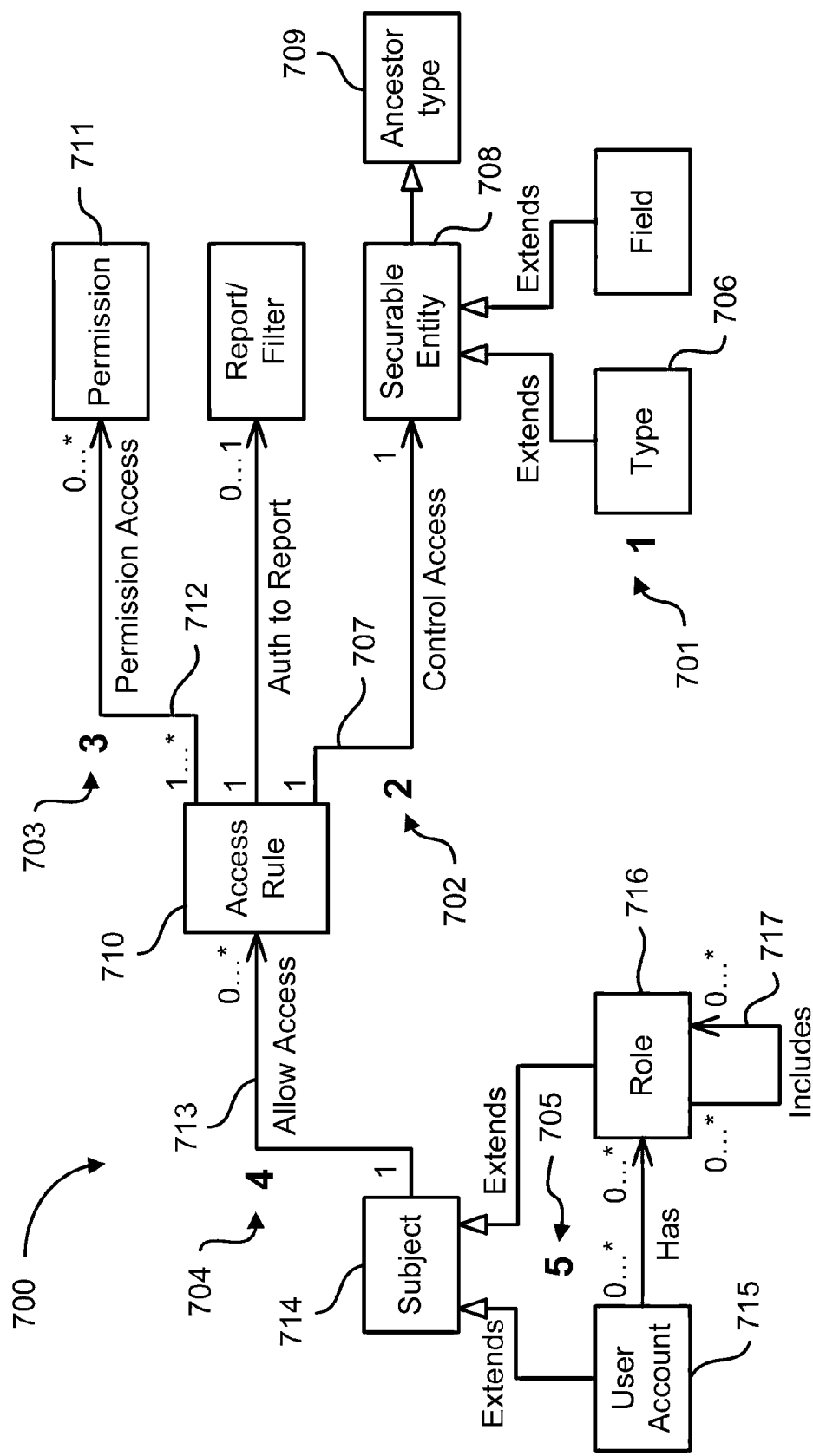
Fig. 6  Create Check ER Model Walking

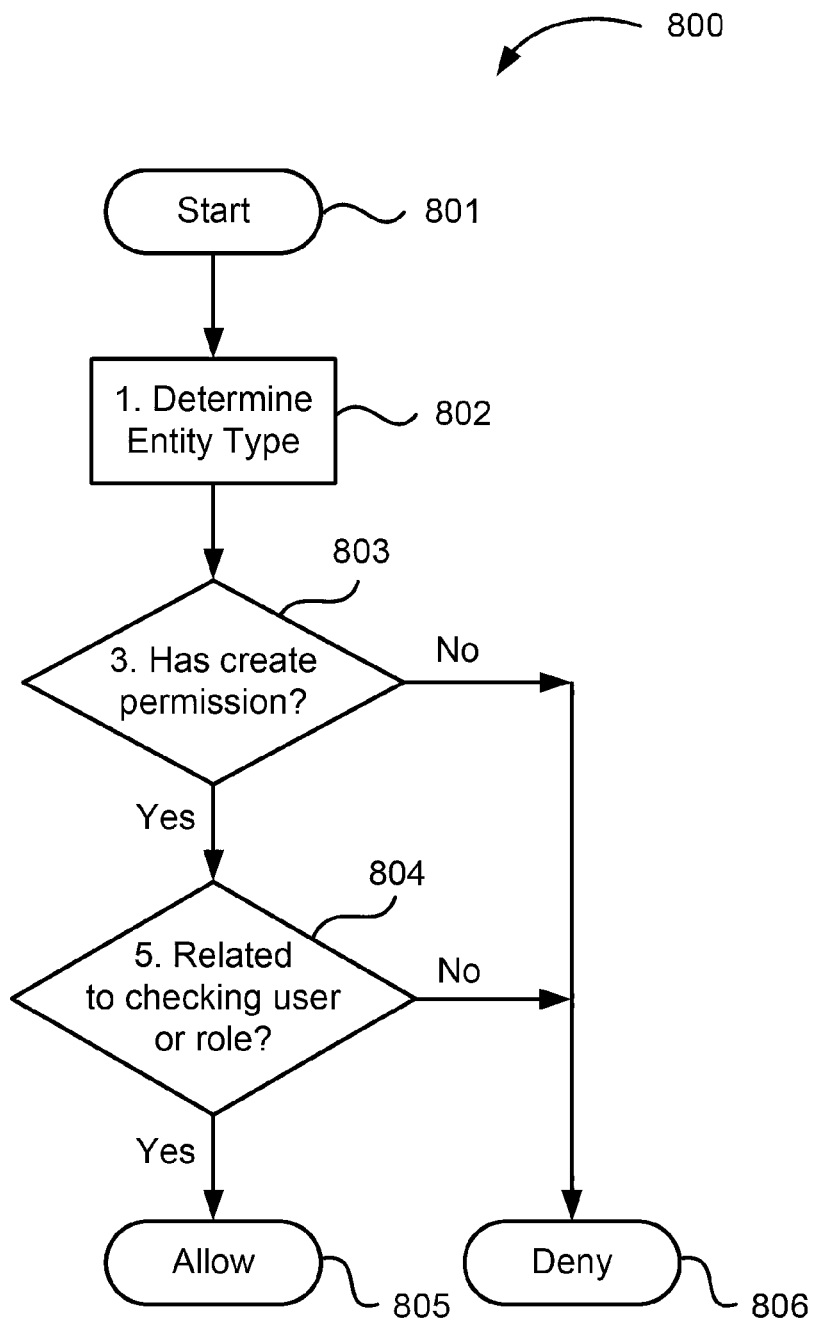
Fig. 7 Create Check Flowchart

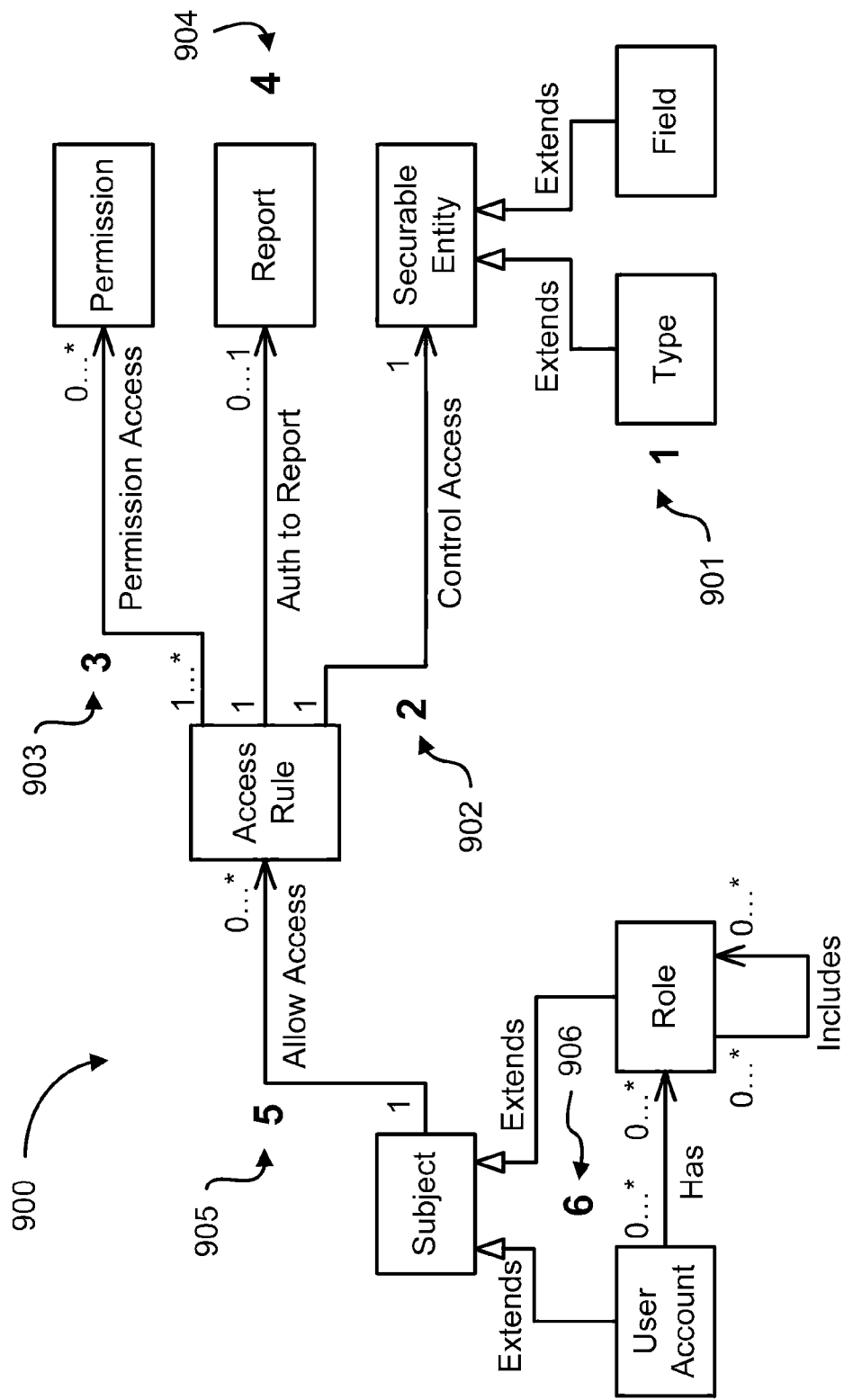
Fig. 8 Non-create ER Model Walking

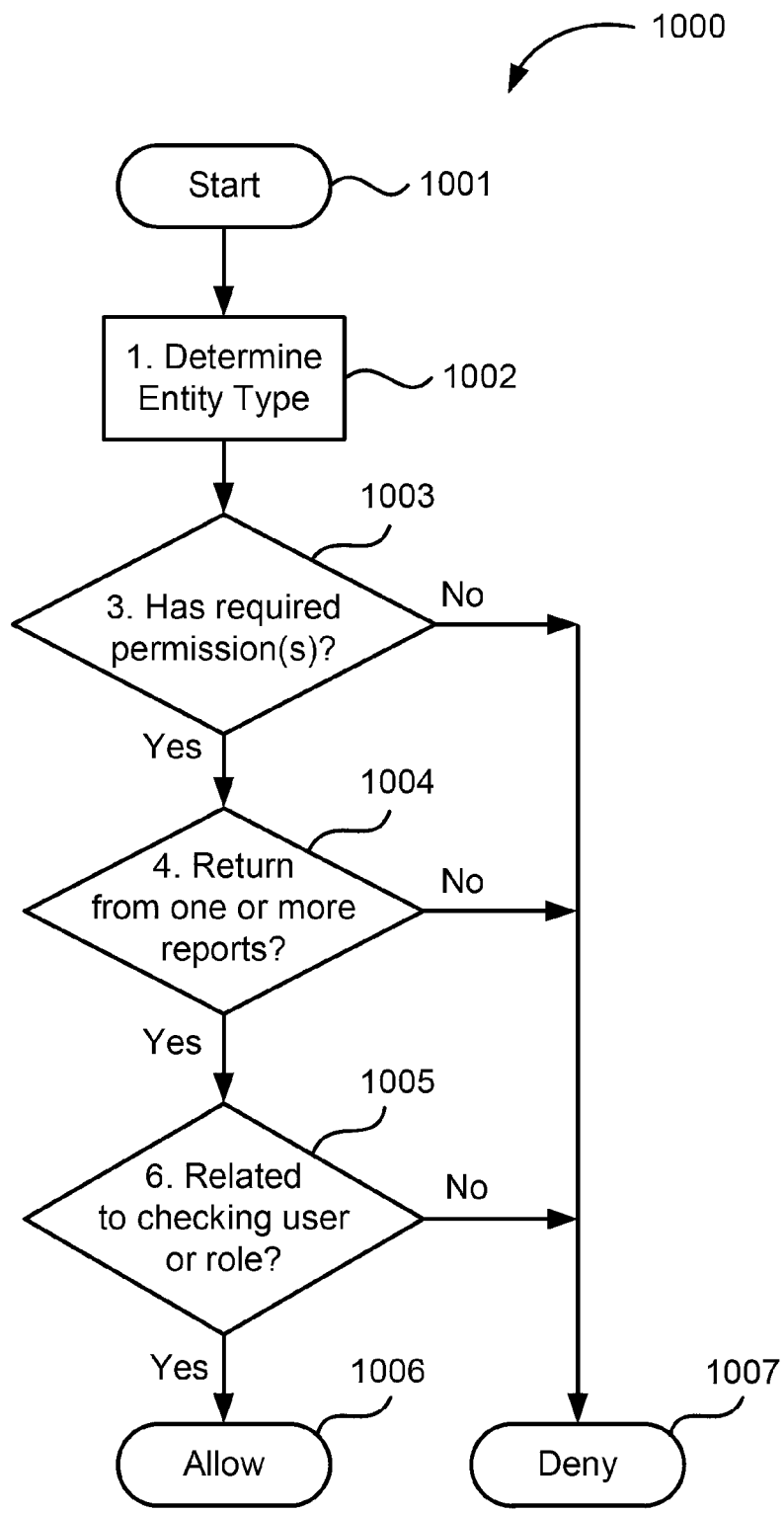
Fig. 9  Non-create Check Flowchart

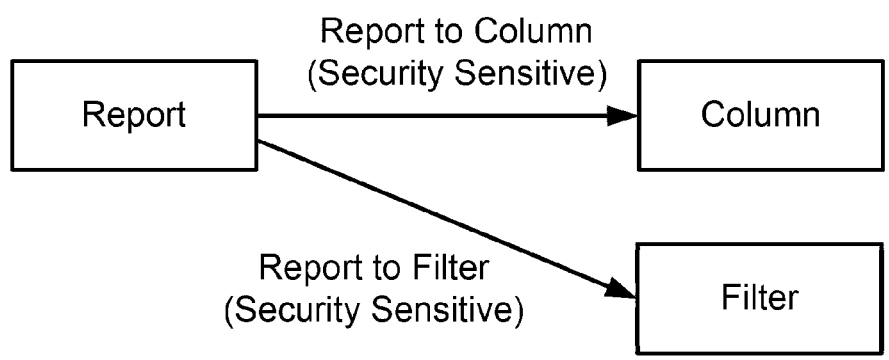
Fig. 10 Sample Report Entity-Relationship Structure

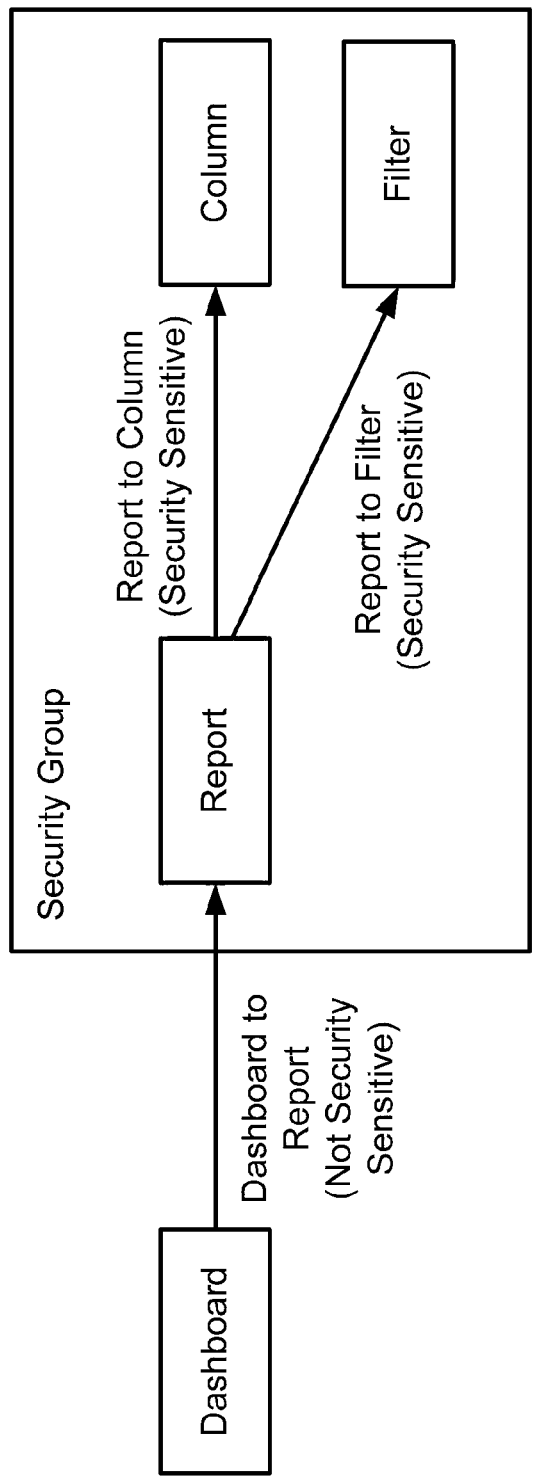
Fig. 11 Entities inside and outside a security group

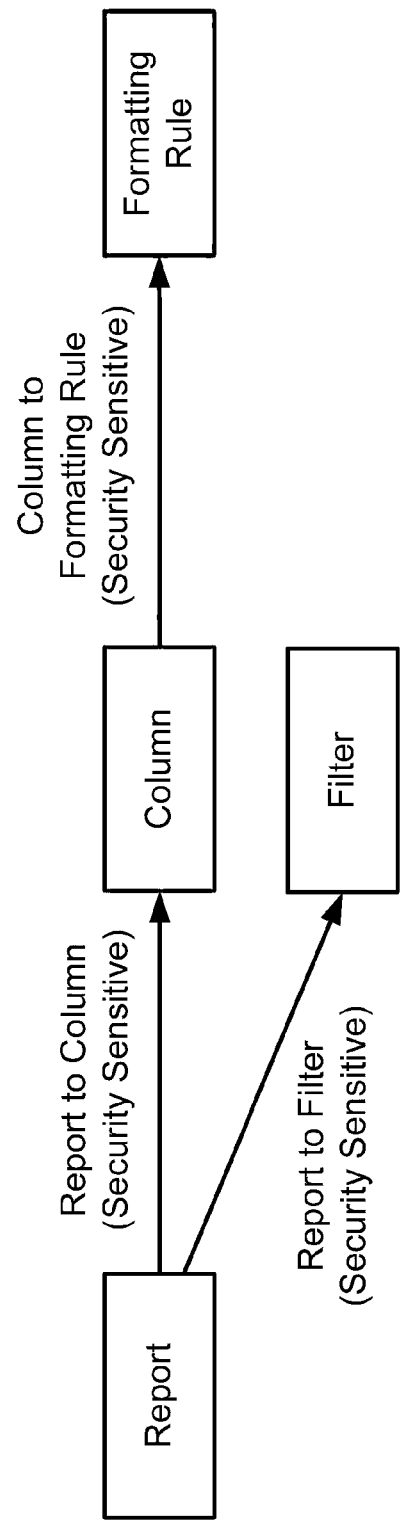
Fig. 12 Transitive security check example

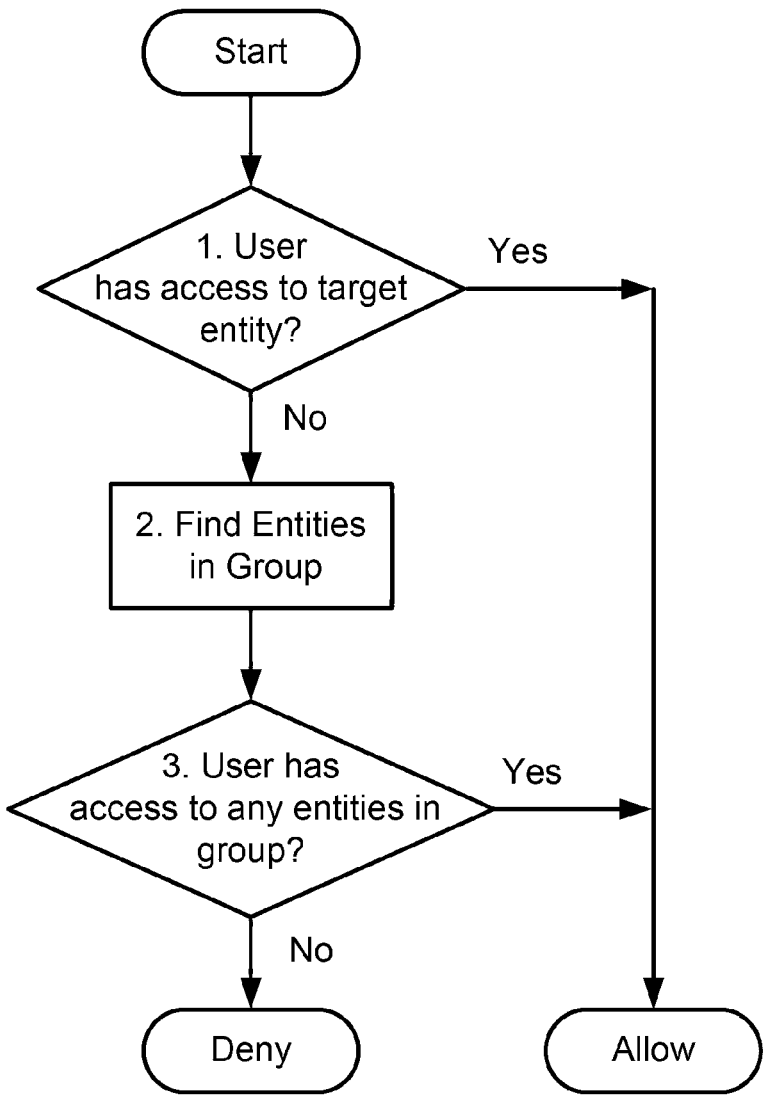
Fig. 13 Entity Group Access Check

SYSTEMS AND METHODS FOR SECURING AN ENTITY-RELATIONSHIP SYSTEM

CROSS-REFERENCE TO RELATED APPLICATIONS

This patent application is a national phase filing under section 371 of PCT/AU2017/000032, filed Feb. 1, 2017, which claims the priority of Australian patent application 2016900465, filed Feb. 11, 2016, each of which is incorporated herein by reference in its entirety.

TECHNICAL FIELD

The present invention relates generally to securing information stored in databases, and in particular, to doing so with respect to data housed in entity-relationship databases. The present invention also relates to a method and apparatus for securing information stored in databases, and to a computer program product including a computer readable medium having recorded thereon a computer program for securing information stored in databases.

BACKGROUND

Access Control

Traditional access control systems; including Role-Based Access Control (RBAC), Mandatory Access Control (MAC) and Discretionary Access Control (DAC); are designed to solve specific problems. For example, MAC was designed to handle military-style operations where information is categories to individual projects or operations and has a classification level. Users can only see information if they are involved in that operation and have sufficient clearance. While this may be appropriate for specific cases like the military example above, it is not suitable for different and potentially unrealized systems.

Some existing access control systems place what may be regarded as too much control in the hands of users. For example, DAC gives the "owner" of the secured entity (e.g. file), usually the creator, ultimate control over who can access the file. This may be satisfactory for a single user system but rarely meets the compliance or confidentially requirements of a larger organization.

Existing access control systems also typically maintain a separate configuration file that must be kept up-to-date. For example, if a person moves to a new position in a company, in addition to HR and finance system changes, separate security configuration changes are often required.

Existing access control systems are often inflexible, being designed so that checks are fast or are easily audited rather than serving business needs. For example, in a Customer Relationship Management (CRM) package, implementing a simple business rule like "a sales person can modify his/her own customers and see others in his/her region" can be difficult if not impossible to implement.

Customers and application vendors are also increasingly asking for access control that is easy for non-technical people to use and can easily and quickly adapt to change. Existing access control systems are usually written for security experts, using their own terminology or requiring specialist training. This is exacerbated as increasingly complex systems are modelled in an entity-relationship system, with corresponding increase in the number of entity types and relationships. More complex objects are often represented as a number of interrelated entities. For example, instead of being a single entity, a report may represent its columns, filters, grouping and row ordering as separate entities.

In current systems, access is usually defined with respect to the type of entity, and accordingly the amount of access control configuration increases with the number of types. Related entities, such as the different entities in a report in the example above, often have similar security configuration. This duplication increases the chance of conflicts, and leads to a higher chance of misconfiguration and also makes audit and verification harder. The complexity of current security configuration hampers changes to the entity-relationship structure, since security needs to be reconfigured on each change, and can expose unnecessary complexity to less technical users.

SUMMARY

Embodiments of the present invention may substantially overcome, or at least ameliorate, one or more disadvantages of existing arrangements.

Disclosed are arrangements, referred to as Entity-relationship Access Rule (ERAR) arrangements (or alternately as ReadiNow Intelligent Engines (RIE) arrangements) in this specification, which seek to address the above problems by embedding security in the form of "Access Rules" within the entity-relationship database system being secured, wherein the access rules themselves are also in the form of entities and associated relationships according to the entity-relationship model (described hereinafter in more detail in APPENDIX 1).

According to a first aspect of the present disclosure, there is provided a computer implemented method of securing information stored in an entity-relationship database system comprising at least one entity-relationship database, the information stored in the entity-relationship database system being stored according to an entity-relationship model, the method comprising the steps of: specifying one or more access rules limiting access to the entity-relationship database system; storing the one or more access rules in the entity-relationship database system according to the entity-relationship model; permitting an accessor to create an entity in the entity-relationship database system if a "create-check" process dependent upon at least one of the one or more stored access rules grants permission; and permitting the accessor to read or modify or delete an entity stored in the entity-relationship database system if a "non-create-check" process dependent upon at least one of the one or more stored access rules grants permission.

According to another aspect of the present disclosure, there is provided a system for securing information stored in an entity-relationship database system comprising at least one entity-relationship database, the information stored in the entity-relationship database system being stored according to an entity-relationship model, the system comprising: one or more processors for executing respective software programs stored in respective memory devices in order to perform a method comprising the steps of: specifying one or more access rules limiting access to the entity-relationship database system; storing the one or more access rules in the entity relationship database system according to the entity relationship model; permitting an accessor to create an entity in the entity relationship database system if a "create-check" process dependent upon at least one of the one or more stored access rules grants permission; and permitting the accessor to read or modify or delete an entity stored in the entity relationship database system if a "non-create-check"

process dependent upon at least one of the one or more stored access rules grants permission.

According to another aspect of the present disclosure, there is provided one or more computer readable non-transitory tangible storage media storing respective software programs for directing respective processors to secure information stored in an entity relationship database system comprising at least one entity relationship database, the information stored in the entity relationship database system being stored according to an entity relationship model, the software programs comprising: computer executable code for specifying one or more access rules limiting access to the entity relationship database system; computer executable code for storing the one or more access rules in the entity relationship database system according to the entity relationship model; computer executable code for permitting an accessor to create an entity in the entity relationship database system if a "create-check" process dependent upon at least one of the one or more stored access rules grants permission; and computer executable code for permitting the accessor to read or modify or delete an entity stored in the entity relationship database system if a "non-create-check" process dependent upon at least one of the one or more stored access rules grants permission.

Other aspects are also disclosed.

BRIEF DESCRIPTION OF THE DRAWINGS

At least one embodiment of the present invention will now be described with reference to the drawings and appendices, in which:

FIG. 1A is a schematic diagram illustrating the physical infrastructure of a cloud platform;

FIG. 4 depicts an access rule schema comprising entities and relationships;

FIG. 5 depicts entities and relationships in a school example;

FIG. 6 depicts a "create check" model and process;

FIG. 7 is a flowchart depicting the create check process of FIG. 6;

FIG. 8 depicts a "non-create check" model and process;

FIG. 9 is a flowchart depicting the non-create check process FIG. 8;

FIG. 10 depicts entities and relationships in a report example;

FIG. 11 depicts entities inside and outside a security group;

FIG. 12 depicts an example of a transitive security check;

FIG. 13 is a flow chart depicting an entity group access check;

Figure 1B:
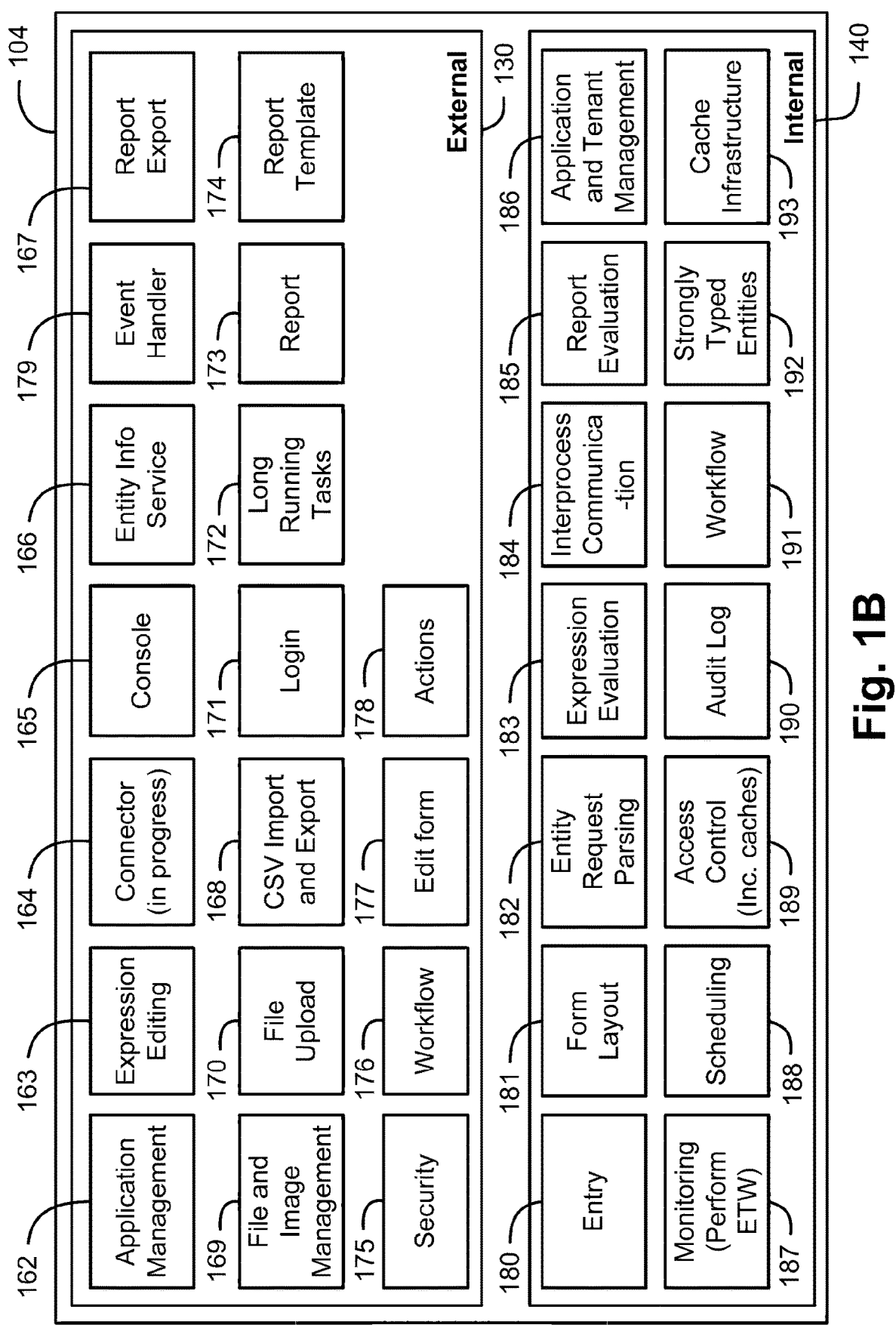
FIG. 1B is a block diagram of the front-end server 104 of the cloud platform in FIG. 1A.

Appendix 1 provides detail about Entity-Relationship Models; and

Appendix 2 provides detail about Reports.

DETAILED DESCRIPTION OF ILLUSTRATIVE EMBODIMENTS

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussion should not be interpreted as a representation by the present inventor(s) or the patent applicant that such documents or devices in any way form part of the common general knowledge in the art.

This specification makes extensive reference to "Entity-Relationship (ER) models" (see Appendix 1 for further details), "Reports" (see Appendix 2 for further details).

The herein-described cloud platform provides a web-based service that enables users to solve their own business problems by creating their own web or desktop software applications largely without the need for computer programming or other technical knowledge. Further, web or desktop software applications created using the system may be customized using the system. The platform is not limited to cloud systems.

The cloud platform also relieves the user from the burden of important, but distracting, activities such as backup, security (the subject of this specification), scalability, and so on by providing these services within the platform itself.

Applications

Software applications can be built by users themselves, or they can be chosen from a suite of pre-written applications provided by the ERAR arrangements, which are then customized by the user. It will be understood that the cloud platform is not limited to particular software applications, and the software applications may be as varied as imagination permits. For example, the software applications may be directed towards customer relationship management, business continuity management, expense tracking, and so on.

The ERAR software applications provided by the RIE Technology include various software modules that logically make up a software experience, such as dashboards, data entry forms, reports, charts and other visualizations, as well as interactivity such as running workflows, triggering business processes, importing and exporting data, template document generation, email notifications, and so on.

Entity Relationship Database

At the heart of the cloud platform is a purpose built entity-relationship database. All data is modelled as entities. For example, employees, projects, clients, contracts, and risks, are all entities. Each entity can have a group of flat field data attached to it, such as names, dates, amounts.

Any entity can be related to any other entity. For example, employees can be related to projects, which can be related to clients and contracts. The user may configure their own new types of relationships between distinct applications to build an interconnected web of data. Data stored in a database in this manner is referred to as being stored according to an entity-relationship model in this specification. These relationships can then be traversed when presenting reports, running workflows, and by other application features. The relationships are also traversed when practicing the ERAR arrangements.

Cloud Platform Construction

The design of the cloud platform is considered at the following levels:
1. The physical infrastructure and the software processes that run on the infrastructure;
2. The functional software services;
3. Multi-tenancy and application hosting;
4. The logical structure of the entity-relationship database; and
5. Client-side code (This is software, such as an "app" installed on a device or downloaded to the device, such as a webpage, that communicates with the cloud platform remotely, such as via web services. The end user interacts with the cloud platform through the client-side code).

Software Services Infrastructure

FIG. 1A is a schematic diagram illustrating the physical infrastructure 100 of a cloud platform 102 upon which the disclosed ERAR arrangements can be practiced. The cloud platform 102 is arranged in an N-tier architecture including a plurality of front end web servers 104, a cache server 106, and a database server 108. The cloud platform 102 can receive web requests from users no using a user device such as their smartphone in, for example, by an application delivery controller (ACD) 112 that routes requests to the front-end web server 104.

The database server 108 may be an SQL server that houses data, and the cache server no may store calculated results for fast access. The majority of the platform software resides on the front-end web servers 104.

Figure 2A:
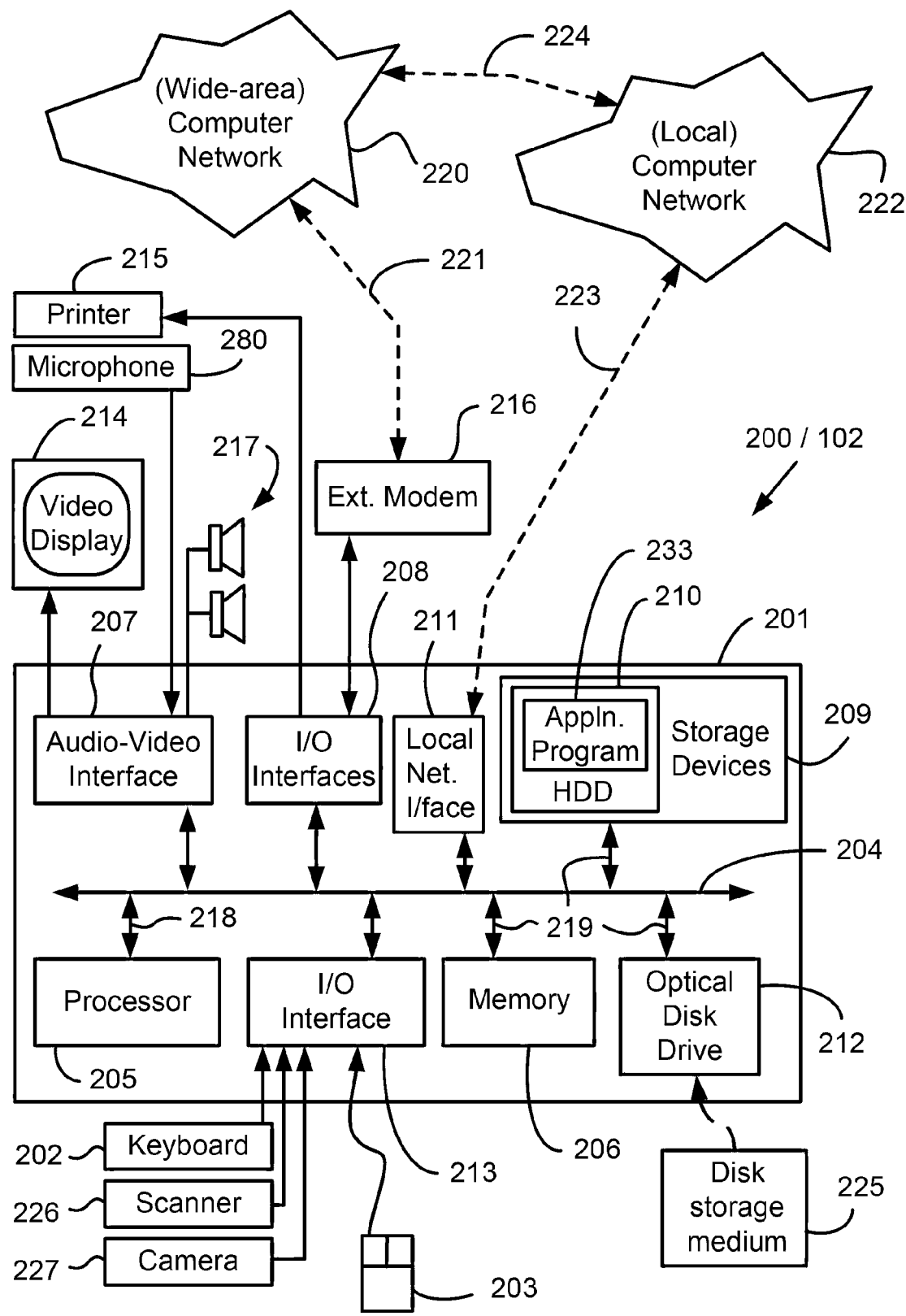
FIGS. 2A and 2B form a schematic block diagram of a general purpose computer system upon which ERAR arrangements described can be practiced.

FIG. 1B is a block diagram of the front-end server 104 depicting a number of internal software modules 140 and external software module 130, all of which are depicted as a single ERAR application 233 executing on the ERAR server 201 (see FIG. 2A). The external software modules 130 are modules exposed by the front-end servers 104 to support client-side (web browser) code, whereas the internal software modules 140 are configured to support various internal features.

The External software modules 130 may include an application management module 162 that enables the installation/removal/management of software applications, an expression editing module 163 that allows syntax checking for calculations that a user can enter when editing reports, and a connector module 164 that allows the cloud platform 102 to interoperate with other online systems by exposing a data communication API. A console module 165 for loading user interface elements such as navigation links and sections, and an entity information service 166 for reading and writing entity-relationship data for communication between the client-code no and the front-end web 104 may also be provided.

The external modules 130 may also include a report export module 167 that provides a tabular report to be converted into a CSV (comma separated variables) or Excel file, a CSV/Excel import module 168 that allows tabular data to be imported into the database 108 as entities, a file and image management module 169 that supports tracking and download of documents, files, and images for storing in the ER model, and a file upload module 170 that uploads files by breaking the files into multiple chunks, reassembling the chunks on the server 104, and storing the files in the database 108. The ER database 108 can be implemented as a single database, or alternately as a number of databases referred to as an ER database system. Other external modules may include a login module 171 for handling user login, authentication, lockout policy, password policy, encryption, etc., and a long running tasks module 172 for tracing a process that could potentially take a long time, such as importing a very large data set.

The external modules 130 further include a reports module 173 that allows database queries to be graphically constructed, a document templates module 174 that allows macro-style Word templates to drive automated document generation, a security module 175 (described hereinafter in more detail with reference to FIGS. 2A, 2B-FIG. 16) that allows access rules to be created and configured to control access to entities, a workflow module 176 that allows users to design business processes as flow charts, which can then be triggered when certain events are detected (such as if the user presses a certain button).

An edit form module 177 allows developers to build data entry forms, and present those forms to end users and an actions module 178 allows application developers to control the activities performed on entities, for example through a right-click context menu. The activities may include editing/deleting a resource, starting a workflow, or generating a document.

The external modules 140 include an event handler module 179 for logging and diagnostics and performing internal code activities when the changes are detected. The internal modules 140 include an entity module 180, which represents the ER database, and a form layout module 181 for generating default edit forms from database schema objects. An entity request parsing module 182 is provided for accepting a request from the entity information service module and converting the text into an object structure for processing. Also included are an expression evaluation module 183 for performing the actual calculation process for calculations that have been entered into workflows or reports, an inter-process communications module 184 for allowing the front-end web servers 104 to communicate with each other (primarily to notify each other of data changes), and a report evaluation module 185 for converting reports into SQL database server queries, and formatting the results.

The internal modules 140 may further include an application and tenant management module 186 that supports application management, a monitoring module 187 that collects system diagnostics information, and a scheduling module 188 for scheduling activities (such as running a workflow) to occur at certain times. An access control module 189 may also be provided to implement and enforce internal security rules. Other internal modules 130 may include an audit log module 190 to detect and record security sensitive events, a workflow module 191 to implement the actual execution of a workflow, a strongly typed entities module 192 that allows an entity schema to be defined in XML and generates source code to allow programmers to program against those entities, and a cache infrastructure module 193 for caching internal server data, such as entity information, report results and so on.

In many cases, the software modules 130 and 140 may be interconnected with each other and may depend on each other. Moreover, although FIG. 1B clearly distinguishes between internal and external modules, that boundary may sometimes be fuzzy.

Figure 1C:
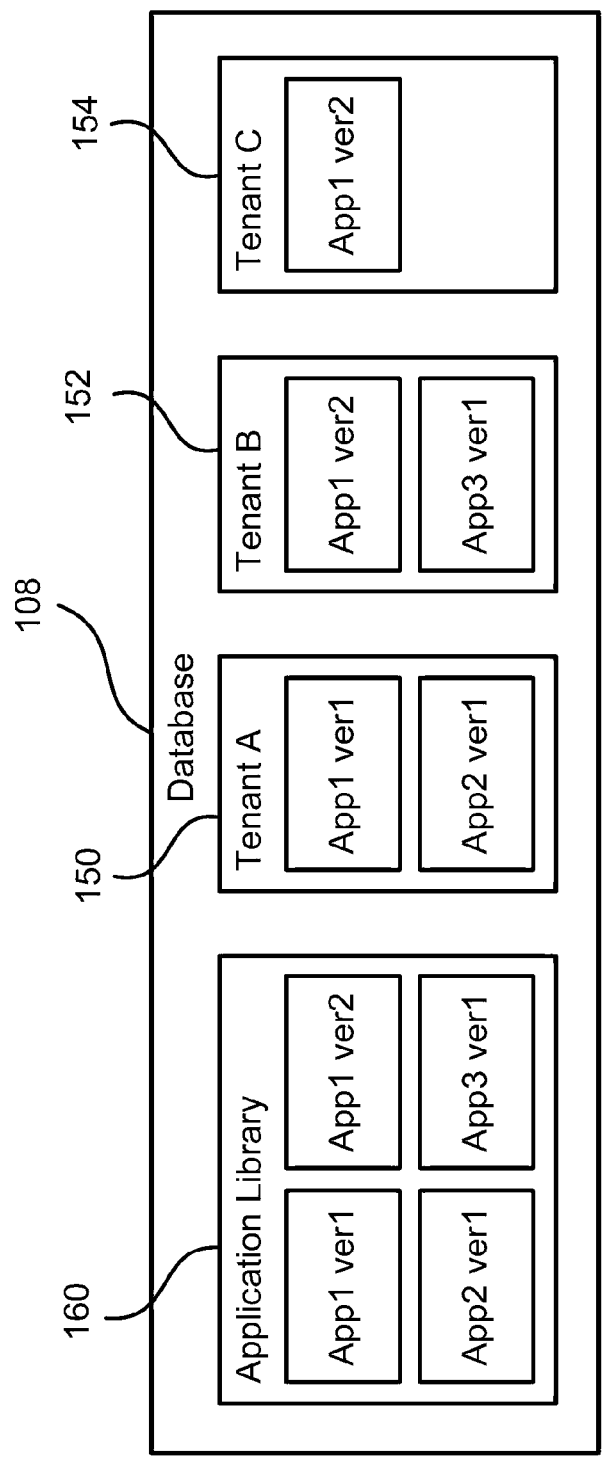
FIG. 1C is a block diagram of the database 108 in FIG. 1A.

The database server 108 hosts multiple clients (tenants), each of whom can use the ERAR arrangements to secure information stored according to an entity-relationship model. Each storage area for each tenant can have different versions of different applications installed. Separate from the tenants, an application library hosts every available version of every available application. User data is also stored within the storage area associated with each tenant. FIG. 1C depicts a block diagram of an exemplary database server 108, including storage areas 150, 152, and 154 for three tenants and an application library 160.

A single set of database tables holds all entity-relationship data for all tenants.

All user data is represented as entities and relationships, as described above. Additionally, all application components are stored in the entity-relationship database. For example, a report may have columns and filters and formatting rules. These are all stored as entities, and a report is connected to its columns, its filters, data source, and so on with relationships.

Moreover, the schema (or metadata) about the application is also stored using entities and relationships. The types of entities that are possible, the fields that they may possess, the relationship types that are defined, and rules for validating input are all stored using entities and relationships.

This unique structure according to the disclosed ERAR arrangements means that all software modules developed to power the cloud platform 102 equally enrich the user's web-based applications, and vice versa. A system that operates or interacts with application data (e.g. form layout, reports) can also be used to interact with customer data and vice versa. For example, a security system, such as that described in the ERAR arrangements, can apply to both application data and customer data. A data import mechanism can import customer data along with forms, reports or anything that an application developer needs.

As described previously, the above systems run on the cloud platform 102. Additionally, a body of code (a software client) is sent to and runs on the user's web browser 333 (see FIG. 3A). This code is configured to provide a user interface for the dynamically generated applications. For application developers, this code can also support application building.

According to one ERAR arrangements, the software client is structured as a single page application (SPA), whereby all code is loaded up front, and communication only goes back to the cloud platform 102 to fetch or modify data.

Figure 2B:
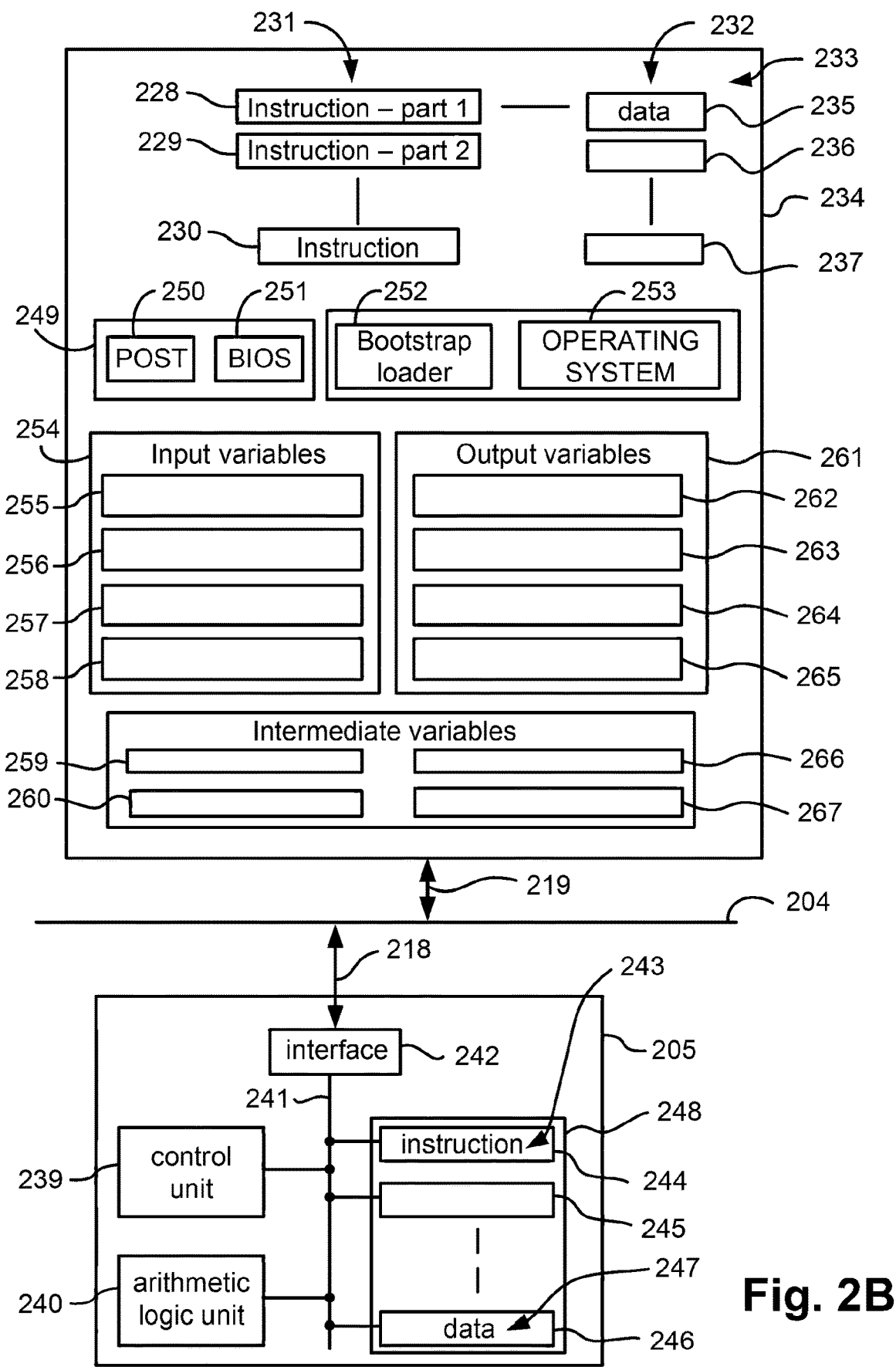

FIGS. 2A and 2B depict a general-purpose computer system 200, upon which the various arrangements described can be practiced. For example, the computer system may form one or more of the servers 104 shown in FIG. 1A. As a further example, the computer system may be a personal PC or desktop computer operated by a user of the system.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practiced include IBM-PC's and compatibles, Sun Sparcstations, Apple Mac™ or like computer systems.

The method of securing an entity-relationship system may be implemented using the computer system 200 wherein the processes of FIGS. 4-16, to be described, may be implemented as one or more software application programs 233 executable within the computer system 200. In particular, the steps of the method of securing an entity-relationship system are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the securing an entity-relationship system methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for securing an entity-relationship system.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for securing an entity-relationship system.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed securing of an entity-relationship system arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4-16 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The method of securing an entity-relationship system may alternatively be implemented in dedicated hardware such as one or more integrated circuits performing the functions or sub functions of securing an entity-relationship system. Such dedicated hardware may include graphic processors, digital signal processors, or one or more microprocessors and associated memories.

Figure 3A:
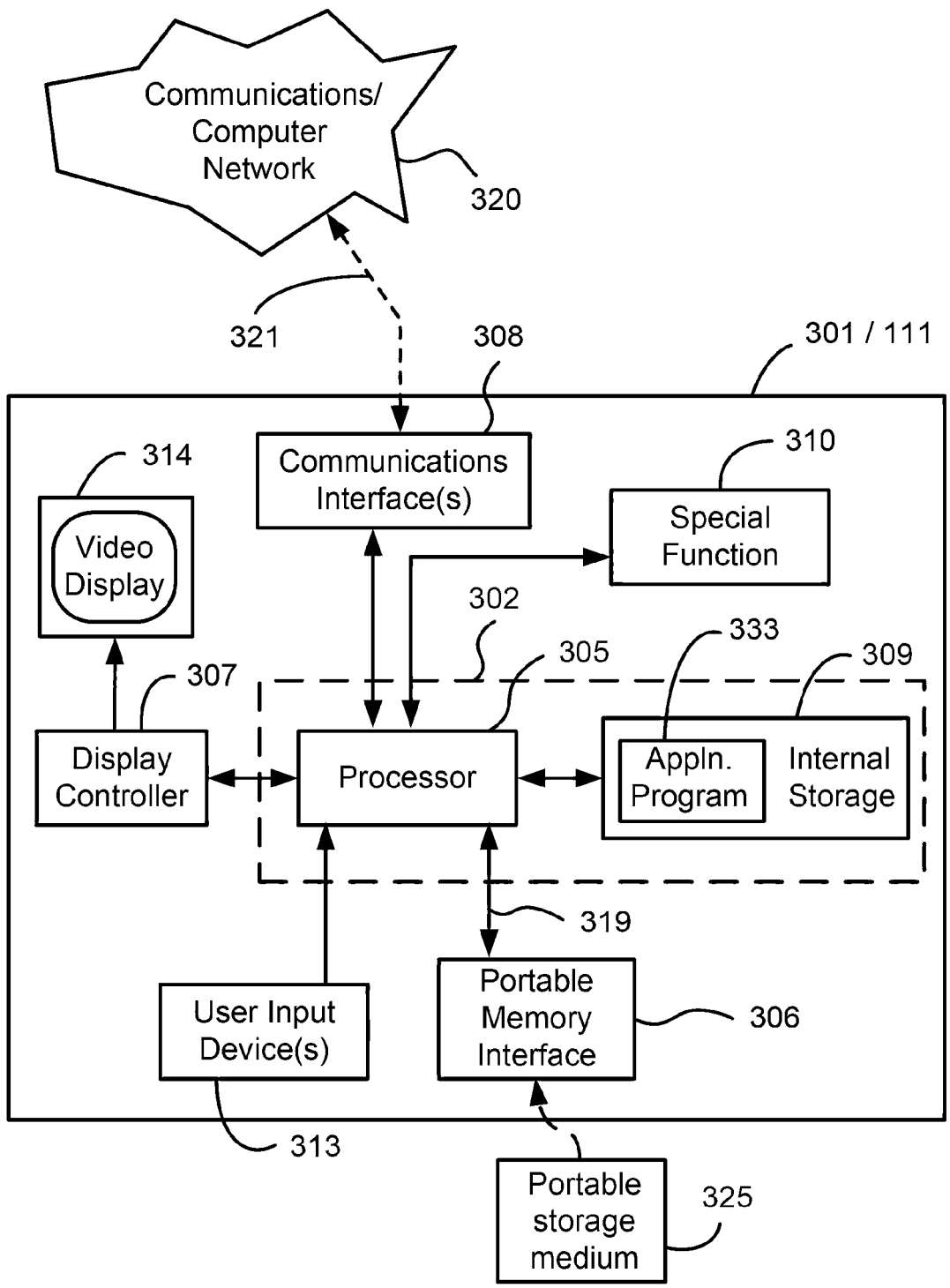
FIGS. 3A and 3B collectively form a schematic block diagram representation of an electronic device upon which described ERAR arrangements can be practiced.
Figure 3B:
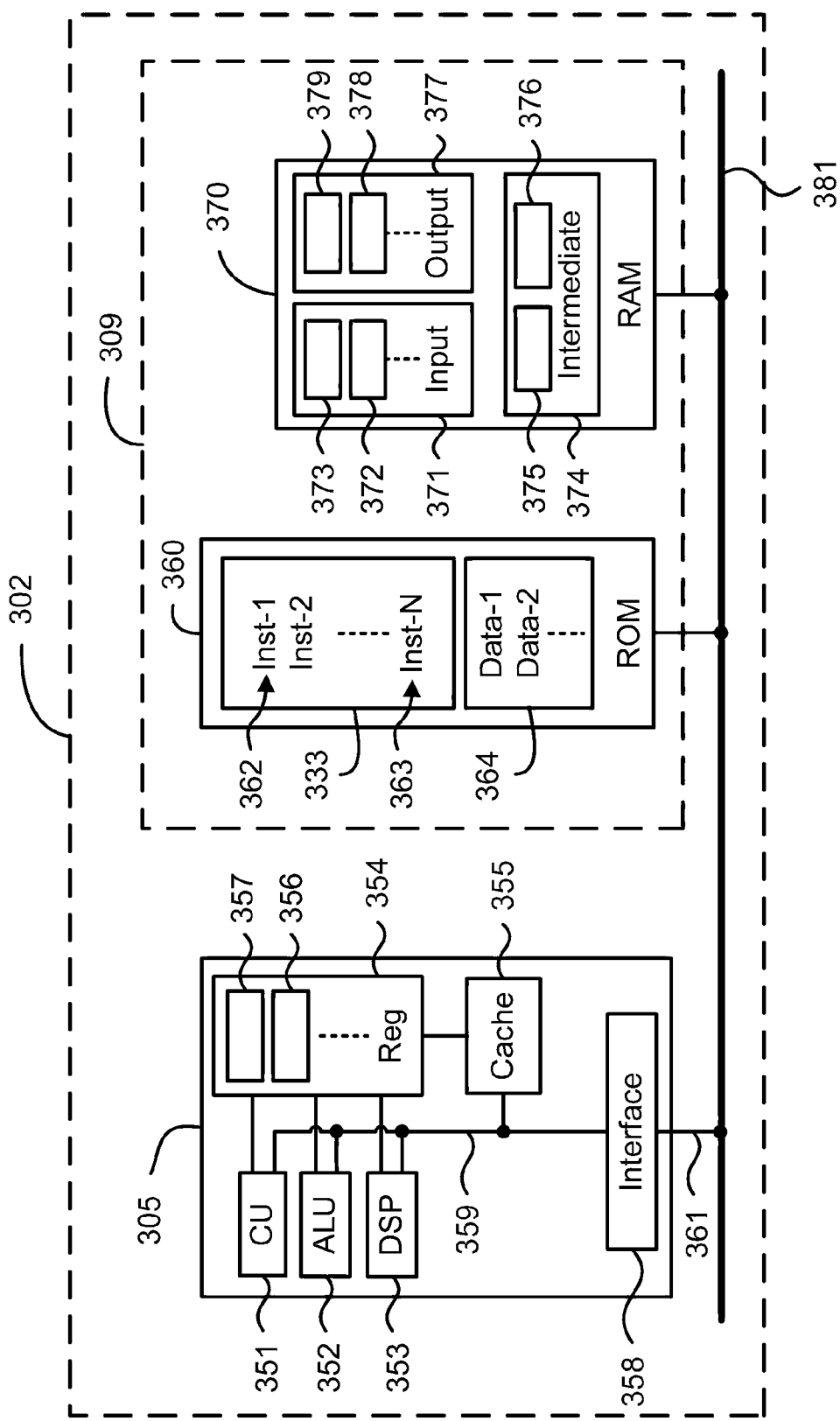

FIGS. 3A and 3B collectively form a schematic block diagram of a general purpose electronic device 301 including embedded components, upon which the securing an entity-relationship system methods to be described are desirably practiced. The electronic device 301 may be, for example, a mobile phone or smartphone 111, a portable media player or a digital camera, in which processing resources are limited. Nevertheless, the methods to be described may also be performed on higher-level devices such as desktop computers, server computers, and other such devices with significantly larger processing resources.

As seen in FIG. 3A, the electronic device 301 comprises an embedded controller 302. Accordingly, the electronic device 301 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit coupling of the device 301 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 301 is configured to perform some special function. The embedded controller 302, possibly in conjunction with further special function components 310, is provided to perform that special function. For example, where the device 301 is a tablet or smartphone in, the component 310 may represent a specialized application for performing the ERAR methods described herein. The special function component 310 is connected to the embedded controller 302. As another example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The ERAR methods described hereinafter may be implemented using the embedded controller 302, where the processes of FIGS. 4-16 may be implemented as one or more software application programs 333 (which can be implemented as a web browser executable within the embedded controller 302. The electronic device 301 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 through 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organized into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the ERAR methods described below is associated with one or more segments of the application program 333, and is performed by repeated execution of a fetch-execute cycle in the processor 305 or similar programmatic operation of other independent processor blocks in the electronic device 301.

Access Control

The inventors have realized that security is part of the business rules and business processes that characterize a business, and should not be regarded as being something separate. Security should thus be expressed in terms of information already stored within the model or system and should preferably be couched in terms that non-technical users can understand.

Accordingly, the ERAR arrangements embeds security in the form of "Access Rules" within the entity-relationship database system being secured, wherein the access rules themselves are also in the form of entities and associated relationships according to the entity-relationship model (described hereinafter in more detail in APPENDIX 1).

There are two aspects to securing entity-relationship data according to the disclosed ERAR arrangements, namely (i) defining access by specifying one or more access rules (described hereinafter in more detail with reference to FIG. 15), and (ii) limiting access by performing appropriate access checks when a user attempts to access the entity-relationship data (described hereinafter in more detail with reference to FIG. 14).

Specification of Access Rules

All data in the disclosed ERAR arrangements is modelled in the form of entities and associated relationships as depicted, for example, in the entity-relationship model in FIG. 5. For example, students, classes, teachers, and schools, as well as employees, projects, clients, contracts, and risks, are all entities. Each entity can have a group of flat field data attached to it, such as names, dates, amounts.

Each user in the disclosed ERAR system is represented by a "User Account" entity. Users can be grouped into roles, represented by "User Role" entities, and roles can be nested. Special roles may exist, such as "Everyone" that includes all users in the system automatically.

"Inheritance", described hereinafter in more detail with reference to FIG. 16, enables attributes to be shared between entities such that a subclass of entities inherits attributes from its parent class of entities.

Figure 16:
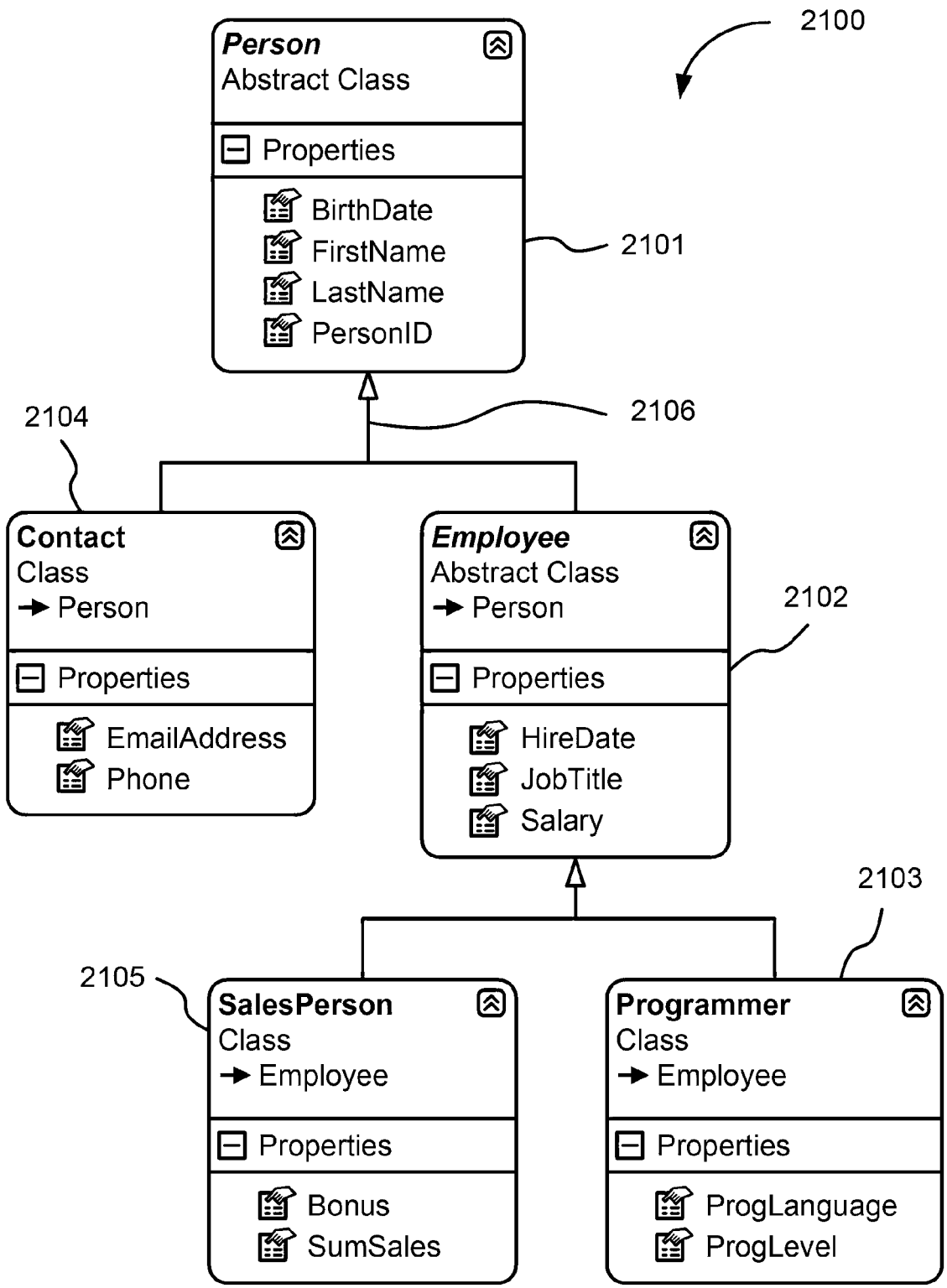
FIG. 16 depicts inheritance of properties in a hierarchy of entities.

FIG. 16 depicts inheritance of properties in a hierarchy of entities. It is noted that empty arrows always point from the derived/child/sub type to the base/parent/super type. A person entity 2101 has properties as depicted, i.e., BirthDate, FirstName, LastName and PersonID. A contact entity 2104 has all the aforementioned properties of the person entity 2101 (i.e. the contact entity 2104 inherits the properties of the person entity 2101, as depicted by the empty arrow head 2106) and has additional properties EmailAddress and Phone. An employee entity 2102 inherits the properties of the person entity 2101, and has additional properties HireDate, JobTitle and Salary. "Employee" entities are of type "Person". All employees are people but not vice versa. For example, in FIG. 4, "User Account" entities and "User Role" entities both inherit from "Subject". All user accounts are subjects but not vice versa. In FIG. 16, "Employee" entities are of type "Person".

By default, users cannot see, modify, create or delete any entities unless granted access by an "Access Rule". An administrator can define Access Rules such as 500 that grant or allow access to entities. That is to say, the system is additive. Each new access rule provides additional access. Access rules do not revoke access provided by other access rules.

Figure 14:
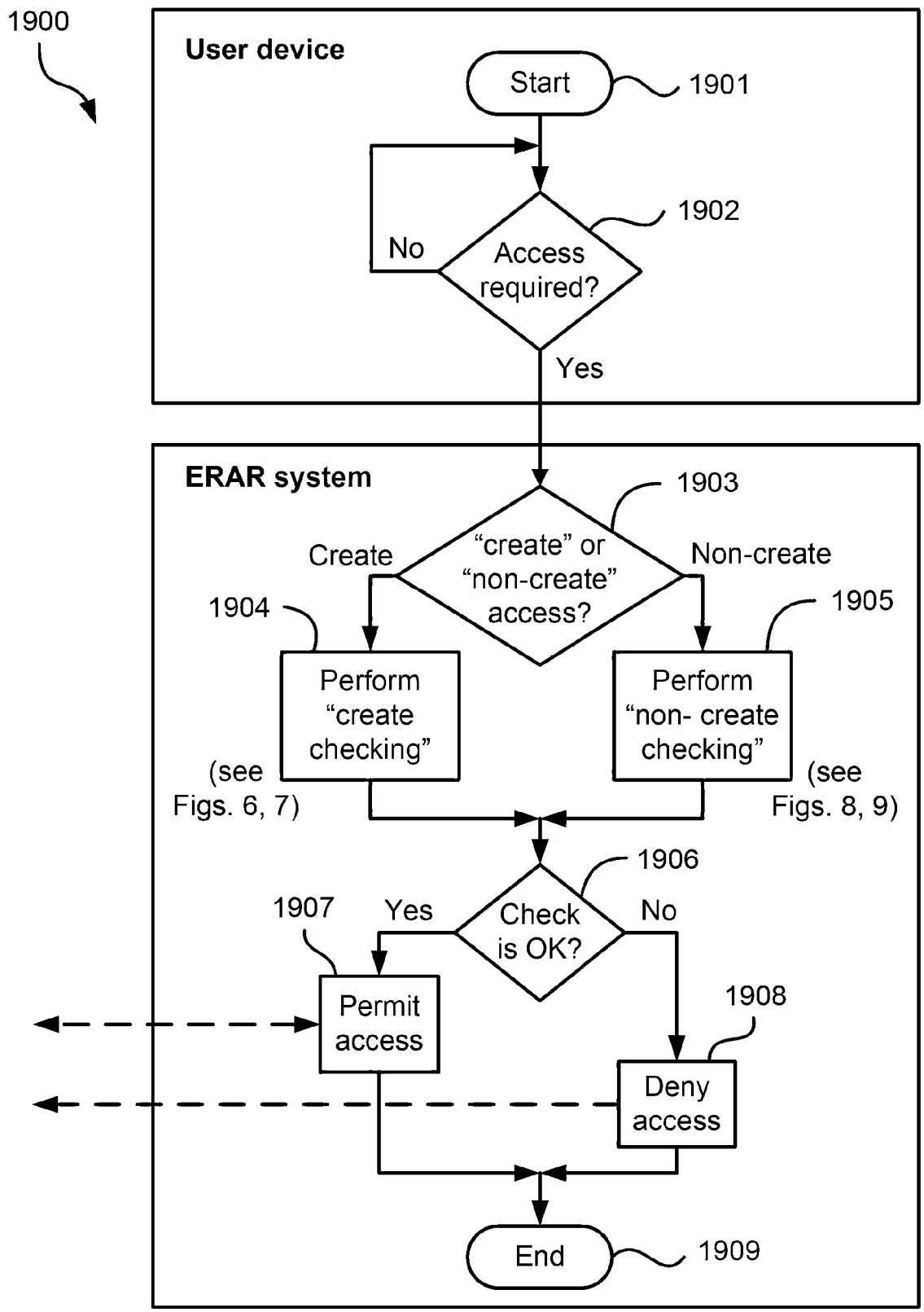
FIG. 14 is a flow chart depicting how a user can access an entity-relationship system according to the ERAR arrangements.

FIG. 14 is a flow chart depicting an example of a process 1900 showing how a user can access an entity-relationship system according to the ERAR arrangements. The process 1900, performed by one or both of the processors 205 and 305 respectively executing the ERAR software applications 233 and 333 commences with a start step 1901 at the user device 111 after which a decision step 1902 determines if a user no wishes to access the secured database system 108 (the user no would typically indicate a desire to access the database via keystrokes to a keypad 313 of his smartphone). If this is not the case, the process 1900 follows a NO arrow back to the step 1902 until such time that the user wishes to access the secured database. If however the user no does wish to access the secured database system 108, then the process 1900 follows a YES arrow to a step 1903, in which the ERAR system determines if the user wishes to create or modify an entity in the database 108. The user no would typically indicate a desire to create or modify an entity in the database via keystrokes to a keypad 313 of his smartphone. If a create access is required, then the process 1900 follows a "create" arrow to a step 1904 which performs the "create check" process as depicted in FIGS. 6, 7. If a "non-create" access is required, then the process 1900 follows a "non-create" arrow to a step 1905 which performs the "non-create check" process as depicted in FIGS. 8, 9. The process 1900 is directed from the steps 1904, 1905 to a step 1906 in which the ERAR system determines if the aforementioned checks are OK. If this is the case, the process 1900 is directed to a step 1907 in which the ERAR system provides the user with permission to access the database 108. If however the check at the step 1906 is not OK, then the process 1900 is directed to a step 1908 in which the ERAR system denies the user permission to access the database 108. From the steps 1907, 1908 the process 1900 is directed to a STOP step 1909.

Figure 15:
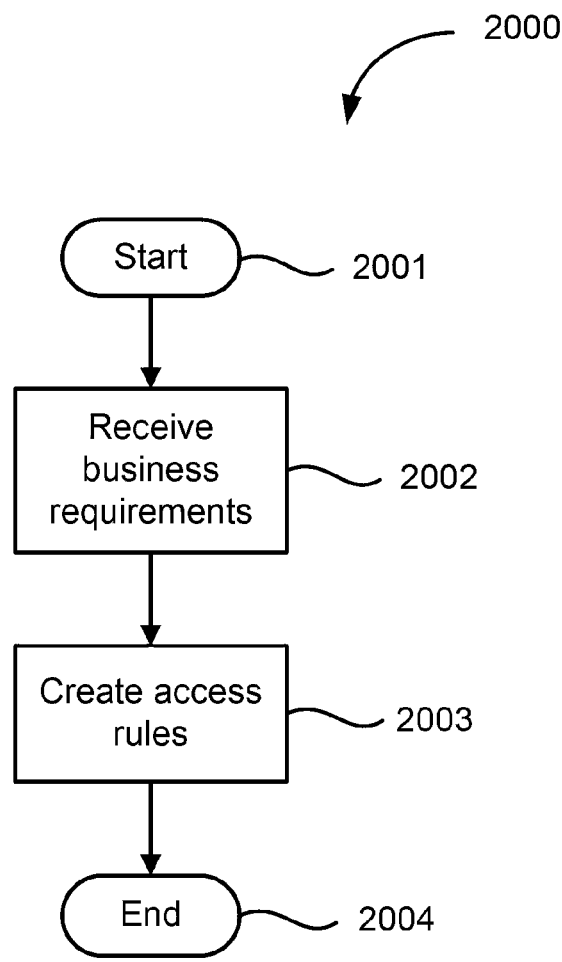
FIG. 15 is a flow chart depicting how an Administrator creates an access rule.

FIG. 15 is a flow chart of a process 2000 depicting how an access rule is specified. Following a start step 2001, an Administrator or an Application Builder receives, in a step 2002, business requirements relating to security of the relevant data (described hereinafter in more detail with reference to an example depicted in FIG. 5). Thereafter, in a step 2003 the administrator creates access rules (such as 500 which is described hereinafter in more detail with reference to an example depicted in FIG. 4) and stores the access rules in the ER database system 108 according to the entity-relationship model. The process 2000 is then directed to an End step 2004.

FIG. 4 is an example of an Entity-Relationship (ER) diagram schema, and depicts entities and relationships in an example of the access rule 500. It is noted, for example, that "User Account" entities and "User Role" entities are both types of "Subject". All user accounts are subjects but not vice versa. The boxes such as 501 show entities. Arrows such as 502 show relationships. Arrows with empty triangles such as 503 show inheritance as described with reference to FIG. 16. The access rule 500 has the following parts:

1. A subject 501 (such as a user, a group of users/role, device, program or anything that can interact with the entity-relationship system) to which the rule 500 applies
2. The subject 501 may be a user account 521 or a user role 511, although other types may be added, such as a service or device;
3. A user can be in a role 511;
4. Roles can be nested by relating to other included roles (as depicted by a reference numeral 522);
5. A relationship 502 linking the subject 501 to the access rule entity 505;
6. A relationship 513 linking the access rule entity 505 to the securable entity 506 it secures;
7. Securable entities may be either type entities 509 or field entities 510, although other entities may be added, such as relationships;
8. A relationship 515 linking the access rule entity 505 to one or more permission entities 507.
9. The permissions 507 or operations which the rule 500 allows (these permissions or operations can be one or more of "read" (i.e. see), "modify", "delete" or "create");
10. A relationship 521 linking the Access Rule entity 505 to a Report 508;
11. The report 508 whose filter defines a subset of entities to which the rule 500 grants access (this is ignored for create access, because users can either create an entity of the given type or not).

The report 508 (described hereinafter in more detail in Appendix A), is capable of returning a list of entities of a particular type that match some filtering condition. The filtering may be based conditions or calculated that make use of the field data on the entities themselves, or related entities. The reports may also filter entities based on their relationships to the current accessor.

Thus, for example, as described hereinafter in more detail with reference to FIG. 5, an access rule such as allow students to see details of students in their class would have the following:
1. Subject 501: The user or a role the user is in (The subject is the user or role that has access, not what access is being granted to. This can be thought of as subject (Subject)-verb (Permission)-object (Securable entity), as is the case in an English sentence.);
2. Entity type 509: Student;
3. Permissions 507: Read; and
4. Report 508: A report that lists all students whose class contains the viewing student. That is to say, all students that are in the same class as the viewing student.

FIG. 5 depicts entities and relationships in a school example 600. The example contains a "Student" entity type 601, a "Class" entity type 602, a "Teacher" entity type 603 and a "School" entity type 604. Students can have a relationship to Classes, representing the students enrolled in the class. Teachers can have a relationship to the Class, representing subjects they teach. Schools can have a relationship to the class, indicating that school provides or runs that class. Entity-relationship schema diagrams as depicted in FIG. 5 do not show single entities or single instances of relations. Rather, they show entity sets (i.e. all entities of the same entity type) and relationship sets (i.e. all relationships of the same relationship type). Thus, a particular student is an entity. However the collection of all students (601) in the collection of all classes (602) is an entity set. The "In" relationship between a particular student and her class is a single relationship. However the set 605 of all such student-class relationships in a database is a relationship set. ER schema diagrams depict entity types and relationship types. For example, Student 601 refers the student type. This means students (entities of type Student 601) can be enrolled in (605) a class (602). There may be student instances that are not in a class or classes without students. Cardinality also comes into play. A class may have multiple students and a student may have multiple classes.

As foreshadowed above, an access rules like "Allow students to see (read) details of students in their class" would be configured as follows:
1. A subject 501, specifically a role containing all students. The user and role entities are shared between different access rules.
2. A relationship 502 between the above role and an access rule entity 505.
3. A relationship 513 from the access rule 505 to a securable entity, specifically the Student entity type 509.
4. A relationship 515 from the access rule 505 to the permissions 507 applicable to the access rule, specifically read. Permission entities are shared between different access rules.
5. A relationship 521 from the access rule 505 to a report 508, which lists all students whose class contains the viewing student.

It is possible to create access rules like "Allow teachers to see (read) and modify details of students in their school". The access rule would be configured as follows:
1. A subject 501, specifically a role containing all teachers. The user and role entities are shared between different access rules.
2. A relationship 502 between the above role and an access rule entity 505.
3. A relationship 513 from the access rule 505 to a securable entity, specifically the Student entity type 509.
4. A relationship 515 from the access rule 505 to the permissions 507 applicable to the access rule, specifically read and modify. Permission entities are shared between different access rules.
5. A relationship 521 from the access rule 505 to a report 508, lists all students in classes that are run by the school that runs classes where the class's teacher is the viewing teacher.

While the second example may sound complicated, it is quite common in more complex examples. It also allows a single access rule to control access by every teacher and avoid configuring access for each teacher individually. It means changing the entities or relationships, such as changing the classes a teacher teaches, transparently and automatically adjusts access. The report filter allows a path to be described between the resource being accessed and the subject that is requesting access. If that path is fulfilled by actual relationship instances, then access is granted.

The required access rule(s) for each entity-relationship model operation are set out in the following Table 1:

TABLE 1

| Operation | Required Access Rule(s) |
|---|---|
| Create Entity Type | A user has an access rule granting create access to the "entity type" entity type. The "entity type" entity type is a special type, effectively the type of a type.<br>For example, to create a new types, the user needs the following access rule to have been created:<br>  1. Subject 501: The user or a role the user is in;<br>  2. Entity type 509: entity type;<br>  3. Permissions 507: create; and<br>  4. Report 508: (Ignored for create operations) |
| Create Field | A user has an access rule granting modify access to the "entity type" type and that entity type needs to be returned in the access rule's report.<br>For example, to add the "Age" field to student 601, the user needs the following access rule to have been created:<br>  1. Subject 501: The user or a role the user is in;<br>  2. Entity type 509: student type;<br>  3. Permissions 507: modify; and<br>  1. Report 508: A report that lists the types the subject can modify, including the student type. |
| Create Relationship Type | A user has an access rule granting create access to the "relationship" entity type. Like "entity type", "relationship" is a special type, effectively the type of a relationship.<br>For example, to create a relationship between a student 601 and their school 604, the user needs the following access rule to have been created:<br>  1. Subject 501: The user or a role the user is in;<br>  2. Entity type 509: relationship type;<br>  3. Permissions 507: create; and<br>  4. Report 508: (Ignored for create operations) |
| Create Entity | A user has an access rule granting create access to the entity type of the entity being created.<br>For example, to create a student 601, the user needs the following access rule to have been created:<br>  1. Subject 501: The user or a role the user is in;<br>  2. Entity type 509: student type 601;<br>  3. Permissions 507: create; and<br>  4. Report 508: (Ignored for create operations) |
| Delete Entity | A user has an access rule granting delete access to the entity type of the entity being deleted and that entity is returned in the access rule's report.<br>For example, to delete a student 601, the user needs the following access rule to have been created:<br>  1. Subject 501: The user or a role the user is in;<br>  2. Entity type 509: student type 601;<br>  3. Permissions 507: delete; and<br>  4. Report 508: A report that lists the students the subject can delete. |
| Set Entity Field | A user has an access rule granting modify access to the entity the field is on and that entity is returned in the access rule's report.<br>For example, to rename a student 601, the user needs the following access rule to have been created:<br>  1. Subject 501: The user or a role the user is in;<br>  2. Entity type 509: student type 601;<br>  3. Permissions 507: modify; and<br>Report 508: A report that lists the students the subject can rename. |
| Get Entity Field | A user has an access rule granting read access to the entity the field is on and that entity is returned in the access rule's report.<br>For example, to see the name of a student 601, the user needs the following access rule to have been created:<br>  1. Subject 501: The user or a role the user is in;<br>  2. Entity type 509: student type 601;<br>  3. Permissions 507: read; and<br>  4. Report 508: A report that lists the students the subject can see. |
| Create Relationship | Either:<br>  1. A user has an access rule granting modify access to the source entity and that entity is returned in the access rule's report AND A user has an access rule granting read access to the destination entity and that entity is returned in the access rule's report. These can be two different access rules.<br>  2. (as the above point but with the source and destination entities swapped)<br>For example, to enroll students 601 to their classes 602, the use needs the following access rules to have been created.<br>First access rule: |

TABLE 1-continued

| Operation | Required Access Rule(s) | |
|---|---|---|
| | 1. Subject 501: | The user or a role the user is in; |
| | 2. Entity type 509: student type 601; | |
| | 3. Permissions 507: | modify; and |
| | 4. Report 508: | A report that lists the students |
| | the subject can enroll to classes. | |
| | Second access rule: | |
| | 1. Subject 501: | The user or a role the user is in; |
| | 2. Entity type 509: class type 602; | |
| | 3. Permissions 507: | read; and |
| | Report 508: | A report that lists the classes |
| | 4. the subject can enroll students in. | |
| | Alternatively, the modify and read permissions can be swapped | |
| | bettween the two access rules. | |
| Delete Relationship | (As for CreateRelationship) | |

A user can also perform these operations if they are a member of a user role that the appropriate access rules apply to. Indeed, this will be the most common case. Accordingly, the subject of an access rule can be either a user account or a user role. If a user account is in a user role, it means that user gains all the access rules that apply to that role. Roles can also be nested.

As described in relation to FIG. 16, access rules follow the entity type inheritance hierarchy. For example, if the entity "Sales Person" inherits from "Employee", any access rule that applies to "Employee" also applies to "Sales Person".

Entities can be related to each other in a "one-to-many" or "many-to-many" manner. This is referred to as the cardinality of a given entity in relation to another. Numbers such as 504 above the start and end of each relationship show cardinality. Cardinality is associated with a specific relationship, not just between two entities. There may be multiple relationships between the same entities, each with different cardinality. Cardinality is an optional feature in the ERAR arrangements.

Examples of cardinality are depicted in the following Table 2:

TABLE 2

| left | right | | example |
|---|---|---|---|
| 1 | 1 | one-to-one | person <-> weight |
| 0 . . . 1 | 1 | optional on one side one-to-one | date of death <-> person |
| 0 . . . * or * | 0 . . . * or * | optional on both sides many-to-many | person <-> book |
| 1 | 1 . . . | one-to-many | Birth Place <-> person |

Where: the first row in Table 2 means that a specific person is associated with a specific weight. The second row means that a specific person may or may not have a date of death. The third row means that each of many specific people may own each of a plurality of books. The fourth row means that a specific birth place can be associated with many people, whereas each person is associated with only one birth place. Note that permutations and combinations are also allowed. For example, a relationship may exist with the left cardinality value being 0 and the right being 0 . . . 1.

Cardinality is referred to as a variation (see [0136] below). The diagram in FIG. 4 includes a variation, showing fields as securable (see "Variations" below).

Creation, deletion and modification of access rules may be logged or audited, as configured by the user or hardcoded in the system. Logging or auditing may also be restricted to access rules affecting certain entities, entity types, fields or relationships, again either as configured by the user or hardcoded in the system.

Variations:
1. Non-report rules: A report is one option for determining the entities to which a rule grants access. However, anything that can filter the set of entities is suitable. One alternative is an access rule that directly describes a relationship path [600] between the entities and the subject that must be followed, rather than relying on the report describing this.
2. Field level security: Fields can be included as something to secure. If an access rule is specified that targets a field instead of an entity type, this replaces access rules that apply to the entity type by virtue of inheritance. This may prevent users from modifying or seeing sensitive fields, such as a person's social security number or an employee's salary, even when the user can otherwise see or modify the entity, by only granting modification permission to certain fields. Alternately, access rules may target that entity type directly.
3. Relationship level security: Relationships can be included as something to secure, similar to field level security. If an access rule is specified that targets a relationship instead of an entity type, this replaces specification of an access for each entity with specification of an access rule for the relationships. This either prevents users from modifying or seeing sensitive relationships or allows users to modify relationships when they can only read (see) the source and destination entities.
4. The required access rules for each operation in Table 1 may vary. For example as follows:
    a. An implementation may be simplified to say that some or all entity types, fields and relationships can only be created by a user that is a member of the special role, e.g. "Administrators".
    b. Certain entity types, entities, fields or relationships may be hardcoded or otherwise configured to be read-only. Access rules that allow modification of these entity types either cannot be created or do nothing.
    c. Certain entity types, entities, fields or relationships may be hardcoded or otherwise configured to be not deletable. Access rules that allow deletion of these either cannot be created or do nothing.
    d. Certain operations may only be available to users that have authenticated in a certain way. For example, changes to certain entity types may require two-factor authentication. For example, normal dayto-day use of a product embodying the ERAR arrangements may just require a user name and password to identify and authenticate the user. However, administrative functions (e.g. editing access rules) may require a second factor, such as the use of a one-time-password generator. The ERAR arrangements may prevent operations and/or operations on certain entities when certain levels of authentication are required.

5. Additional operations or permissions. For example, a "Workflow" entity may have a separate "Run" permission.
6. Using the report for create permission checks. For example, a user may be able to create student entities if they teach a class. This may be achieved by searching for the subject in the report, rather than searching for the entity being secured.
7. Access rules may be stored using a different structure. The present ERAR arrangements above talks about the best way of storing access rules in an entity-relationship model. However, other methods of storing access rules can be used. For example, the permissions may be listed as fields on the "Access Rule" entity instead of relationships to separate entities. User accounts and roles may have separate relationships to the access rule and not through the inherited "Subject" entity. Entity types and other securable entities have separate relationships to the access rule entity instead of via the inherited "Securable Entity" entity type. Access rules may be conceivably stored in another way altogether rather than an entity relationship model.
8. Separate access rules may be specified for denying access either in addition to allow access rules (usually with deny taking precedence) or instead of (granting users access to all entities except for those specifically denied).

Checks

Access control checks fall into two main categories:
1. Create checks: Checks on create permission. These associate a user and an entity type only. This includes the CreateEntityType and CreateEntity operations. Creates are unique because they do not apply to a specific entity instance.
2. Non-Create checks: Checks on read, modify or delete permission. These associate a user, an entity type and a filter (which may be implemented as a report) that lists the entities applies to any operation other than CreateEntityType and CreateEntity.

The results of a check may be cached to improve performance.

Entities may be accessed in bulk, meaning the checks can be performed in bulk. This may lead to efficiencies, such as determining the set of applicable access rules once for each type of entity being checked and/or running reports once.

These checks may be logged or audited, as configured by the user or hardcoded in the system. A subset of these checks may be logged or audited, again as configured by the user or hardcoded in the system.

Create Check

An accessor is allowed to create an entity, called a "create check", if all the following are true for one or more access rules:

1. The access rule applies to the type of the entity being created or one of its ancestor types (i.e. types that it inherits, types that the inherited types inherit and so on),
2. The access rule has the "create" "Permission" entity and
3. The access rule has a subject of either the user (i.e. the accessor) or a "User Role" the user is in.

FIG. 6 depicts one implementation of the "create check" model and process, which operates as follows (in relation to the example which allows students to see details of students in their class):

1. Determine (701) the type (706) of the entity being created and all ancestor types (709) (i.e. types that it inherits, types that the inherited types inherit and so on). Take the example where a user (i.e. an accessor) wants to create a "Student" entity as shown in FIG. 5. The "Student" entity type 601 inherits from a "Person" type 606.
2. Traverse (702) the "Control Access" relationship (707) from each of the entity types (708) to locate Access Rules (710) that apply to that entity type. Continuing the above example, the system would start at the "Student" and "Person" entity types and follow the relationship to applicable "Access Rule" entities.
3. Identify (703) the "Access Rule" entities (710) that have a "Permission Access" relationship (712) to the "create" "Permission" entity (711) only. Continuing the above example, the system would find any "Access Rule" entities that were related to the "Create" permission.
4. Traverse (704) the "Allow Access" relationship (713) to "Subject" entities (714). Continuing the above example, the system would follow the relationship from applicable "Access Rule" entities with a related "Create" permission to applicable "Subject" entities.
5. If the user (i.e. the accessor) is one of the Subjects (714) or in a "User Role" that is one of the subjects, grant (705) the user access. Otherwise, deny the user access. Finishing the above example, the user is granted access if the "Access Rule" entities are related to either the user's "User Account" entity (715) or a "User Role" (716) the user (i.e. accessor) is recursively (717) a member of.

FIG. 7 is a flowchart showing an example of a process 800 associated with FIG. 6 and operates as follows. The process steps depicted in FIG. 7 are performed by one or both of the processors 205 and 305 respectively executing the ERAR software applications 233 and 333. The process 800 commences with a start step 801. Thereafter a step 802 determines an Entity Type of the entity desired to be created by an accessor. A following step 803 determines for each Access Rule Entity being considered if the Access Rule entity has a Permission Access relationship to a Create Permission entity. If this is not the case, the process 800 follows a NO arrow to a deny step 806 which denies the accessor permission to create the entity for the current access rule. If however the step 803 determines that the Access Rule entity has a Permission Access relationship to a Create Permission entity then the process 800 follows a YES arrow to a step 804 which determines if the accessor is a Subject entity having an Allow Access relationship with the identified Access Rule entity. If this is not the case, the process 800 follows a NO arrow to the deny step 806 which denies the accessor permission to create the entity for the current access rule. If however the step 804 determines that the accessor is a Subject entity having an Allow Access relationship with the identified Access Rule entity, then the process 800 follows a YES arrow to a step 805 which permitting the accessor to create the entity in the entity relationship database system. When multiple access rules are under consideration, an allow 805 according to one or more of the rules will allow creation of instances of the Entity Type, irrespective of whether other rules have evaluated to deny 806.

However, any implementation that achieves the requirements outlined in [0135] is valid. For example, the "create check" process may be performed in the reverse direction (from the subject to type instead of type to subject) if it is easier to implement or more efficient. In addition, access rules only need to be checked until one grants the user access. The rest can be ignored. Take the example of a teacher accessing a student. There may be two access rules in place, one that grants a teacher read and modify access to students in their class and another that grants a teacher read access to students in their school. If a teacher attempts to see details of a student in her class, the system would determine that two access rules need to be checked. After checking the first one, which grants the teacher access, there is no need to check the second one.

Non-Create (Read, Modify or Delete) Check

An accessor is allowed to read, modify or delete an entity, called a "non-create check", if all the following are true for one or more access rules:
1. The access rule applies to the type of the entity being created or one of its ancestor types (i.e. types that it inherits, types that the inherited types inherit and so on),
2. The access rule has the "read", "modify" and/or "delete" "Permission" entity corresponding to the requested access,
3. The access rule has a report that, when run, returns the entity in its results and
4. The access rule has a subject of either the user (i.e. the accessor) or a "User Role" the user is in.

FIG. 8 depicts one implementation of the "non-create check" model and process. The process operates as follows (in relation to the example which allows students to see details of students in their class):
1. Determine (901) the type of the entity being accessed (i.e. read, written, deleted) and all ancestor types (types that it inherits, types that the inherited types inherit and so on). Take the example where a user wants to see (read) a "Student" entity as shown in FIG. 5. The "Student" entity type inherits from a "Person" type.
2. Traverse (902) the "Control Access" relationship from each of the types to the "Access Rule" entity. Continuing the above example, the system would start at the "Student" and "Person" entity types and follow the relationship to "Access Rule" entities.
3. Identify (903) the "Access Rule" entities that have a "Permission Access" relationship to the required "Permission" entities (either "read", "modify" and/or "delete") only. Continuing the above example, the system would find any "Access Rule" entities that were related to the "Read" permission.
4. For each of these, traverse (904) the "Auth to Report" relationship and run each report. Take the access rules whose reports returned the entity(ies) being checked. Continuing the above example, the system would run the related reports. If they returned the target Student, it would continue.
5. Traverse (905) the "Allow Access" relationship from the "Access Rule" entity to the "Subject" entity. Continuing the above example, the system would follow the relationship from "Access Rule" entities with a related "Read" permission to the "Subject" entity.
6. If the user is the "Subject" or in a "Role" that is the subject, grant (906) the user access. Otherwise, deny the user access. Finishing the above example, the user is granted access if the "Access Rule" entities are related to either the user's "User Account" entity or a "User Role" the user is recursively a member of.

FIG. 9 is a flowchart showing an example of a process 1000 associated with FIG. 8 and operates as follows. The process steps depicted in FIG. 9 are performed by one or both of the processors 205 and 305 respectively executing the ERAR software applications 233 and 333. The process 1000 commences with a start step 1001. Thereafter a step 1002 determines an Entity Type of the entity desired to be read, written to, or deleted by an accessor. A following step 1003 determines for each Access Rule Entity being considered if the Access Rule entity has a Permission Access relationship to a Read Permission or a Write Permission or a Delete Permission entity. If this is not the case, the process 1000 follows a NO arrow to a deny step 1007 which denies the accessor permission to read, write to or delete the entity by the current access rule. If however the step 1003 determines that the Access Rule entity has a Permission Access relationship to a Read Permission or a Write Permission or a Delete Permission entity then the process 1000 follows a YES arrow to a step 1004 which determines if the Access Rule Entity includes the entity to be accessed after applying a Filter entity (such as a Report) to the Access Rule entity. If this is not the case, the process 1000 follows a NO arrow to the deny step 1007 which denies the accessor permission to read, write to or delete the entity in question by the current access rule. If however the step 1004 determines that the Access Rule Entity includes the entity to be accessed after applying a Filter entity (such as a Report) to the Access Rule entity, then the process 800 follows a YES arrow to a step 1005 which determines if the accessor is a Subject entity having an Allow Access relationship with the determined Access Rule entity. If this is not the case, the process 1000 follows a NO arrow to the deny step 1007 which denies the accessor permission to read, write to or delete the entity in question by the current access rule. If however the step 1005 determines that the accessor is a Subject entity having an Allow Access relationship with the determined Access Rule entity, then the process 1000 follows a YES arrow to a step 1006 which permits the accessor to Read or Modify or Delete the entity to be accessed. When multiple access rules are under consideration, an allow 1006 according to one or more rules will allow the accessor to Read or Modify or Delete the entity being accessed, irrespective of whether other rules have evaluated to deny 1007.

Like the "create check", this may be performed in the reverse direction or out of order if the results are the same, it is easier to implement or more efficient. For example, running reports is generally computationally expensive and so may be the last step performed. Reports only need to be run until one access rule grants the user access, too.

Entity Grouping

Specification

To summarize, if the ERAR arrangements grant access for a particular permission to a particular entity, then that permission may also be implicitly conferred to a group of other entities that are directly or indirectly related to the initial entity. This group is defined through marking certain types of relationships between entities as "security significant".

FIG. 10 depicts entities and relationships in a report example. For example, a report, which may be represented as an entity, may represent its columns and filters as separate entities (as shown below). By marking the "report to column" relationship type and the "report to filter" relationship type as security significant, access to the report, its columns and its filters can be controlled through access to the report. An administrator only needs to secure the report to secure the columns and filters, too.

FIG. 11 depicts entities inside and outside a security group. The conferring of permission does not extend to entities outside this group. For example, a dashboard may include this report but, if the relationship between the report and the dashboard is not marked as security sensitive, the access to the report does not affect access to the dashboard (as shown in FIG. 11).

FIG. 12 depicts an example of a transitive security check. For example, if a report has columns, a column has a formatting rule and both the "report to column" and "column to formatting rule" relationships are marked as security sensitive, access to formatting rules can be controlled through access to the report (as shown in FIG. 12).

FIG. 12 also illustrates that there may be more than one entity that can cause permissions to be conferred to another entity. In this example, an access rule may grant a permission to the report, which then confers permission to the column, which then confers permission to the formatting rule. Alternatively, an access rule may directly grant access directly to the column, which would confer permission to the Formatting Rule. Therefore, any given entity may have a group of entities to which it confers permissions, as well as a group of entities that confers permissions to it.

The security sensitive setting on a relationship may be hardcoded in the system, set by an administrator, a user customizing the system, an end user or programmatically (e.g. via an API). Entity-relationship systems may restrict who, when or under what conditions the security sensitive setting may be viewed or changed, such as for efficiency, ease of implementation or security reasons. The configuration change may occur through the product user interface, an API, a configuration file or some other interaction.

Variations:
1. There may be different permissions involved with access. For example, an entity-relationship system may define separate read, modify and delete permissions. This security sensitive flag may share all access (e.g. granting read and modify access on a report may also grant read and modify access to the report columns and filters) or separate flags may be used for each access type. If deny permissions are used, these may follow the same or different precedence (e.g. denies overriding allows or vice versa).
2. The security sensitive flag may be directional. For example, if a relationship goes from a report to its columns, there could be a "Secures 'To' type" flag that grants the user access to the 'to' or destination type if the user has access to the source or from type. A "Secures 'From' Type" flag would grant access in the opposite direction. Both flags could be set on the same relationship to ensure identical access to entities on both sides of the relationship.
3. Security can be defined on the relationship type, meaning all relationships of that type exhibit the same behavior, or individually on the relationship instance, meaning the conferring of permissions can be turned on or off for some relationships of the same relationship type and not others.
4. Security can be defined on the group instead of an entity in that group. This is useful if there is no clear entity to be the "primary" or "root" entity for the group and access absolute instead of granted conditionally on fields, relationships or other aspects of that entity or its type.
5. Individual entities may have more or less permissive access than other entities in the same group. For example, a user might have read but not modify access to all entities in a report but a non-administrator user may not be able to access administrator only reports. This is common in entity-relationship systems that use multiple methods of access control and some mechanisms take precedence over others.
6. The relationship used to group entities may be introduced specifically for that purpose and not already exist in the entity-relationship model or system.
7. The set of security sensitive relationships may be hard coded within the system; or it may be configured by the security administrator using the product. The set of entity types over which the system operates may be fixed, or it may be customizable.

Checks

FIG. 13 is a flow chart depicting an entity group access check. The process operates as follows:
1. When access is requested to an entity, called the "target entity", access to that entity is checked (such as by the above mechanism and/or different mechanisms).
2. If the user does not have access and access is not explicitly denied, the ERAR arrangements recursively walks any security sensitive relationships to find all the other entities in the group that would directly or indirectly confer access to the entity being checked.
3. The ERAR arrangements checks whether the user has the requested access to the entities in the group. If the user has the requested level of access to any of these entities, access is granted to the target entity.

Entities may be accessed in bulk, meaning the checks can be performed in bulk. This may lead to efficiencies, such as determining the membership of the group once and reusing that for access to each requested entity.

Entities may be accessed by a user, such as through a UI, or by a device, e.g. via an API. Or by another process, such as an automated workflow, that is acting on a user's behalf.

These checks may be logged or audited, as configured by the user or hardcoded in the system. A subset of these checks may be logged or audited, again as configured by the user or hardcoded in the system. The message may include details of what relationships were included in each check and what entities were checked.

The security sensitive setting on a relationship may be cached for efficiency. The results of the check or access to individual entities may also be cached for efficiency. More detail is included on this below.

Variations:
1. Access may be checked on entities related by security sensitive relationships before the initial entity (i.e. steps 2 and 3 above may be performed before step 1). This may also be for speeding up checks if the access control system has cached that the user already has the requested level of access to the target entity.

INDUSTRIAL APPLICABILITY

The arrangements described are applicable to the computer and data processing industries and particularly for the Data security industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX 1

Entity-Relationship Model

This ERAR arrangements uses an "entity-relationship" (ER) model or system to represent business objects and access rules. An entity represents a physical or abstract object like a person, company, computer, car or cost center. An entity has fields, like a person's name, a car's vehicle identification number (VIN) or a cost center's code. Entities may have relationships between them. For example, a person may own a computer, a car may be manufactured by a company or a cost center may be within a department. An example of an ER model is depicted in FIG. 5.

Entity relationship (ER) models often model metadata as entities and relationships. For example, every entity in the system has a type. These are represented as type entities in the system, such as 601, 602, 603 and 604 on FIG. 5. When types inherit other types, this is represented by a special relationship, such as 504 on FIG. 4.

The following operations or actions are a typical minimum set available on an entity-relationship model or system:

1. Create Entity Type. This takes a unique name and an optional list of entity types to inherit from. When an entity type inherits from another type, any fields or relationships associated with the other type also apply to the inheriting type. This operation returns an entity type ID. If an entity of that name already exists or this creates a cycle in the inheritance hierarchy, an error occurs.
2. Create Field. This takes an entity type ID, field name and a field type (e.g. number, currency, string, date). If a field of that name already exists on that entity type or the entity type does not exist, an error occurs.
3. Create Relationship Type. This takes a unique name and two entity type IDs and returns a unique relationship type ID. One entity type ID is the source or originating entity type and the second is the destination entity type. An error occurs if either the source or destination entity type ID does not exist or a relationship of that name already exists. A relationship can be created where the source entity type and destination entity type are the same type.
4. Create Entity. This takes an entity type ID as an argument and returns a unique identifier of the newly created entity. An error occurs if that entity type does not exist.
5. Delete Entity. This takes an entity ID and deletes that entity along with any fields and relationships involving it. An error occurs if that entity does not exist.
6. Set Entity Field. This takes an entity ID, a field ID and a field value. The previous value of that field for that entity is overwritten. An error occurs if that entity does not exist, the field does not exist, the field is not associated with that type or the value is not valid for that field type (e.g. putting a date into a number field).
7. Get Entity Field. This takes an entity ID, a field ID and returns the field value. An error occurs if that entity does not exist, the field does not exist or the field is not associated with that type.
8. Create Relationship: This takes a source entity ID, a destination entity ID, a unique name and a relationship type ID and returns a unique relationship ID. An error occurs if the source entity, destination entity or relationship do not exist.
9. Delete Relationship: This takes a relationship ID and deletes that relationship. An error occurs if the relationship does not exist.

Common variations and improvements include:

1. Adding additional operations, such as deleting a field or entity type.
2. Representing entity types and relationships as entities. This allows them to have fields and relationships.
3. Adding additional metadata to relationships, such as enforcing cardinality.
4. Adding more field types or field validation (e.g. phone number, social security number).
5. Bulk versions, i.e. ones that operate on multiple entities/entity types/fields/relationships.
6. Relationships may internally be represented as special fields containing the ID of the associated entity.

These operations may be via any form, including web services, COM/CORBA objects, dynamically linked libraries, statically linked libraries or outside of a computer system.

The method of storage may be within a traditional SQL or relational database, a graph database, XML or outside of a computer system.

Relationships may also be virtual. For example, if an employee has a department and a department has a company, the transitive relationship of employee to company could be expressed as a single relationship even though it is composed of multiple relationships for efficiency or simplification.

APPENDIX 2

Reports

This ERAR arrangements relies on the ability for users to easily create customizable tabular data, usually referred to as a "report". For the purpose of this ERAR arrangements, the critical piece is the ability for a non-technical user to easily view and customize a filter for the results (in this specification, a "report" is one example of how a "filter" can be implemented). Specifically, the filter can:

1. Apply a comparison operation to a field. For example, a teacher may create a report showing his/her students that passed a test (by comparing their test result with 50%), those that play cricket (by selecting the "cricket" choice from a list of sport choices) or those with surnames whose first letter is in the latter half of the alphabet (by selecting those with a surname that starts with the letters L through Z inclusive).

2. Apply a comparison operation to a field on a related entity. For example, the school principal may create a report showing which students failed a test for a specific teacher (by following the relationship from student to teacher and selecting the teacher from a list of teachers). The operation may span multiple relationships transitively. Relationships may be followed in either direction. Relationships may be followed recursively where it makes sense to do so.
3. Comparison operations may be particular to the type of field. For example, if the entity is a person, one option is to check whether the person is the person running or viewing the report. This means a report could be created that shows the results of students in my class then shared with each teacher knowing that each teacher will automatically only see the results of students in their class.
4. The filtering process may follow multiple heterogeneous relationships in order to perform the comparison. For example, a report may return a list of assignments. The filter may follow a relationship from each test result to a student. Then a second relationship to the teacher. Then finally compare the teacher to the current user. In this way, the report shows assignments that are applicable to the teacher's students.
5. The filtering process may follow relationships recursively in order to perform the comparison. For example, a report may show employees. The 'employee's manager' relationship may be followed recursively, and then the manager compared to the current user. In this way, for any given manager, the report will show the employees that directly or indirectly report to them.
6. Apply the intersection of any of the above operations, e.g. students that passed a test and that play cricket.
7. Apply the union of any of the above operations, e.g. students that passed a test or play cricket.
8. Combinations of the previous two points, e.g. (students that passed a test or play cricket) and that are in my class. This usually involves some form of precedence, traditionally specified through parentheses.
9. All of the above acting on calculations or formulae involving fields. For example, a teacher may create a report showing students that got over 50% in a report. The data may contain a field showing the score out of 30. The report may calculate the percentage and reference that in its comparison.

All of the above acting on arguments or parameters to the report. For example, a teacher may create a report showing the marks of each student by class. The class is a parameter the teacher selects before running the report and the report filter only includes students in that class.

Reports capable of performing the various operations described in this appendix are non-novel and readily created using a variety of technologies, including Microsoft SQL Server.

The invention claimed is:

1. A computer implemented method of securing information stored in an entity-relationship database system comprising at least one entity-relationship database, the information stored in the entity-relationship database system being stored according to an entity-relationship model, the method comprising the steps of:
specifying one or more access rules limiting access to the entity relationship entity-relationship database system;
storing the one or more access rules in the entity-relationship entity relationship database system according to the entity-relationship entity relationship model;
permitting an accessor to create an entity in the entity-relationship database system if a "create-check" process dependent upon at least one of the one or more stored access rules grants permission; and denying the accessor permission to create the entity in the entity-relationship database system if the "create-check" process does not grant permission;
permitting the accessor to read or modify or delete an entity stored in the entity-relationship database system if a "non-create-check" process dependent upon at least one of the one or more stored access rules grants permission; and denying the accessor permission to read or modify or delete an entity stored in the entity-relationship database system if the "non-create" check process does not grant permission; wherein the one or more access rules further comprise a filter defining a subset of entities of the specified type of entity for which the one or more access rules can grant permission.

2. The method according to claim 1, wherein:
the accessor comprises at least one of a user, a group of users, a role, a device, and a software executable program; and the access ruleone or more access rules comprises:
a type of entity to which the one or more access rules can grant permission; and
a permission for at least one of read access, modify access, delete access, and create access for which the one or more access rules can grant permission to the accessor.

3. The method according to claim 1, wherein the filter is a report, such that entities listed in the report are accepted by the filter.

4. The method according to claim 1, wherein the filter can be configured to accept entities based on:
field data for the entity;
relationship data for the entity;
a relationship path between the entity and the accessor;
a formula language using one or more of the field data for the entity, the relationship data for the entity, and the relationship path between the entity and the accessor; and
comparisons using one or more of the field data for the entity, the relationship data for the entity, and the relationship path between the entity and the accessor.

5. The method according to claim 1, wherein the "create-check" process comprises the steps of:
determining an Entity Type of the entity to be created;
determining an Access Rule entity that has (i) a Control Access relationship with the determined Entity Type and (ii) a Permission Access relationship to a Create Permission entity; and
permitting the accessor to create the entity in the entity-relationship entity relationship database system if (i) the accessor is a Subject entity having an Allow Access relationship with the identified determined Access Rule entity, or (ii) the accessor is in a User Role that is the Subject entity having an Allow Access relationship with the identified determined Access Rule entity; wherein the step of determining an Entity Type of the entity to be created determines ancestor types of the entity to be created.

6. The method according to claim 5, wherein the step of determining the Access Rule entity comprises the steps of:

traversing the Control Access relationships between the entity to be created and corresponding Access Rule entities;

identifying the corresponding Access Rule entities that have Permission Access relationships to Create Permission entities; and traversing the Allow Access relationships between the identified Access Rule entities and a Subject entity.

7. The method according to claim 1, wherein the "non-create check" process comprises the steps of:

determining the Entity Type of the entity to be accessed;

determining all Access Rule entities that (i) have a Control Access relationship with the determined Entity Type to be accessed; (ii) have a Permission Access relationship to a Read Permission or a Write Permission or a Delete Permission entity corresponding to the permission being sought; (iii) have an Access Rule to Report relationship with a Filter entity; (iv) include the entity to be accessed after applying the Filter entity to all instances of the said Entity Type; and permitting the accessor to Read or Modify or Delete the entity to be accessed if (i) the accessor is a Subject entity having an Allow Access relationship with the determined Access Rule entity, or (ii) the accessor is in a User Role that is the Subject entity having an Allow Access relationship with the identified determined Access Rule entity.

8. The method of claim 7, wherein the step of determining the Access Rule entity comprises the steps of:

traversing the Control Access relationships between the entity to be accessed and corresponding Access Rule entities;

identifying the corresponding Access Rule entities that have Permission Access relationships to Read Permission or Write Permission or Delete Permission entities only;

traversing the Access Rule to Report relationships between the identified Access Rule entities and corresponding Filter entities, and filtering the identified Access Rule entities to identify Access Rule entities associated with the entity to be accessed; and for the Access Rule entities identified by the filtering, traversing Allow Access relationships between the identified Access Rule entities and a Subject entity.

9. The method according to claim 7, wherein the step of determining an Entity Type of the entity to be created determines ancestor types of the entity to be created.

10. The method according to claim 7, wherein the filter is a report.

11. The method according to claim 1, wherein if a target entity that the accessor desires to create or read or modify or delete has "Security Sensitive" relationships to one or more entities in a group, then the method comprises the further steps of:

traversing the Security Sensitive relationships between the entities in the group to identify an entity to which the accessor can be granted the desired permission according to the corresponding access rules; and permitting the accessor the desired permission to the target entity if the group has a member to which the accessor can be granted the desired permission according to the corresponding access rules.

12. The method according to claim 11, wherein the relationships are transitive, such that if there exists an indirect path of "Security Sensitive" relationships between the target entity and other entities, then the method operates as though there was a direct "Security Sensitive" relationship between the target entity and the other entities.

13. The method according to claim 11, wherein:

at least one of the Security Sensitive relationships is directional; and the traversing is limited by the directionality of the Security Sensitive relationship.

14. A system for securing information stored in an entity-relationship entity relationship database system comprising at least one entity-relationship entity relationship database, the information stored in the entity-relationship entity relationship database system being stored according to an entity-relationship entity relationship model, the system comprising:

one or more processors for executing respective software programs stored in respective memory devices in order to perform a method comprising the steps of:

specifying one or more access rules limiting access to the entity-relationship entity relationship database system;

storing the one or more access rules in the entity-relationship entity relationship database system according to the entity-relationship entity relationship model;

permitting an accessor to create an entity in the entity-relationship database system if a "create-check" process dependent upon at least one of the one or more stored access rules grants permission; and denying the accessor permission to create the entity in the entity-relationship database system if the "create-check" process does not grant permission;

permitting the accessor to read or modify or delete an entity stored in the entity-relationship database system if a "non-create-check" process dependent upon at least one of the one or more stored access rules grants permission; and denying the accessor permission to read or modify or delete an entity stored in the entity-relationship database system if the "non-create" check process does not grant permission; wherein the one or more access rules further comprise a filter defining a subset of entities of the specified type of entity for which the one or more access rules can grant permission.

15. One or more computer readable non-transitory tangible storage media storing respective software programs for directing respective processors to secure information stored in an entity-relationship entity relationship database system comprising at least one entity-relationship entity relationship database, the information stored in the entity-relationship entity relationship database system being stored according to an entity-relationship entity relationship model, the software programs comprising:

computer executable code for specifying one or more access rules limiting access to the entity-relationship entity relationship database system;

computer executable code for storing the one or more access rules in the entity-relationship entity relationship database system according to the entity-relationship entity relationship model;

computer executable code for permitting an accessor to create an entity in the entity-relationship database system if a "create-check" process dependent upon at least one of the one or more stored access rules grants permission; and for denying the accessor permission to create the entity in the entity-relationship database system if the "create-check" process does not grant permission;

computer executable code for permitting the accessor to read or modify or delete an entity stored in the entity-relationship database system if a "non-create-check" process dependent upon at least one of the one or more stored access rules grants permission; and for denying the accessor permission to read or modify or delete an entity stored in the entity-relationship database system if the "non-create" check process does not grant permission;

wherein the one or more access rules further comprise a filter defining a subset of entities of the specified type of entity for which the one or more access rules can grant permission.

16. The one or more computer readable non-transitory tangible storage media according to claim 15, further comprising computer executable code for:

determining an Entity Type of the entity to be created;

determining an Access Rule entity that has (i) a Control Access relationship with the determined Entity Type and (ii) a Permission Access relationship to a Create Permission entity; and permitting the accessor to create the entity in the entity-relationship database system if (i) the accessor is a Subject entity having an Allow Access relationship with the determined Access Rule entity, or (ii) the accessor is in a User Role that is the Subject entity having an Allow Access relationship with the determined Access Rule entity.

* * * * *